US011657166B2

(12) United States Patent
Sun et al.

(10) Patent No.: US 11,657,166 B2
(45) Date of Patent: *May 23, 2023

(54) INTELLIGENT DISPLAY OF CONTENT

(71) Applicant: Rovi Guides, Inc., San Jose, CA (US)

(72) Inventors: Jing Sun, King of Prussia, PA (US);
Yunbo Tang, Malvern, PA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,402

(22) Filed: May 23, 2022

(65) Prior Publication Data

US 2022/0284111 A1     Sep. 8, 2022

Related U.S. Application Data

(63) Continuation of application No. 16/197,822, filed on Nov. 21, 2018, now Pat. No. 11,372,985.

(51) Int. Cl.
*G06F 21/60*     (2013.01)
*G06F 21/32*     (2013.01)
(Continued)

(52) U.S. Cl.
CPC ............. *G06F 21/604* (2013.01); *G06F 3/14* (2013.01); *G06F 21/32* (2013.01); *G06V 40/161* (2022.01)

(58) Field of Classification Search
CPC .... G06F 21/604; G06F 21/32; G06F 21/6218; G06F 21/84; G06F 21/6245; G06F 3/14;
(Continued)

(56) References Cited

U.S. PATENT DOCUMENTS 7,131,132 B1    10/2006 Gehlot et al.
7,360,160 B2    4/2008 Matz
(Continued)

FOREIGN PATENT DOCUMENTS

WO    2017102763    6/2017

OTHER PUBLICATIONS

PCT International Search Report for International Application No. PCT/US2019/062272, dated Jan. 28, 2020 (14 pages).

(Continued)

*Primary Examiner* — Han Yang
(74) *Attorney, Agent, or Firm* — Haley Guiliano LLP

(57) ABSTRACT

Systems and methods for intelligent display of content are disclosed herein. According to one illustrative method, a computing device camera captures an image of a face. The control circuitry determines, based on the captured image, whether at least a portion of the face is directed toward a computing device display. The control circuitry retrieves, from a memory, a rule specifying criteria for determining whether to block or permit presentation of content based on whether one or more faces are directed toward the display. The control circuitry determines, based on the rule and whether at least a portion of the face is directed toward the display, whether to block or permit the presentation of the content, and blocks or permits the presentation of the content via the computing device based on a result of the determining.

16 Claims, 16 Drawing Sheets

(51) Int. Cl.
*G06F 3/14* (2006.01)
*G06V 40/16* (2022.01)

(58) Field of Classification Search
CPC .......... G06F 2221/2137; G06V 40/161; G09G 2320/0613; G09G 2354/00; G09G 3/20; G09G 2358/00
See application file for complete search history.

(56) References Cited

U.S. PATENT DOCUMENTS

| | | |
|---|---|---|
| 9,355,612 B1 | 5/2016 | Shepard et al. |
| 9,672,387 B2 | 6/2017 | Thörn et al. |
| 9,955,218 B2 | 4/2018 | Panchaksharaiah et al. |
| 10,445,702 B1 | 10/2019 | Hunt |
| 11,372,985 B2 | 6/2022 | Sun et al. |
| 2003/0189601 A1 | 10/2003 | Ben-Shachar et al. |
| 2004/0255321 A1 | 12/2004 | Matz |
| 2005/0227678 A1 | 10/2005 | Agrawal et al. |
| 2006/0161853 A1 | 7/2006 | Chen et al. |
| 2006/0190826 A1 | 8/2006 | Montgomery et al. |
| 2007/0179829 A1 | 8/2007 | Laperi et al. |
| 2008/0034435 A1 | 2/2008 | Grabarnik et al. |
| 2010/0205667 A1 | 8/2010 | Anderson et al. |
| 2010/0216458 A1 | 8/2010 | Cai et al. |
| 2010/0325653 A1 | 12/2010 | Matz |
| 2011/0016492 A1 | 1/2011 | Morita |
| 2011/0072452 A1 | 3/2011 | Kim et al. |
| 2011/0113097 A1 | 5/2011 | Takeuchi |
| 2011/0181492 A1 | 7/2011 | Soeda |
| 2012/0197734 A1 | 8/2012 | Deluca |
| 2012/0272287 A1 | 10/2012 | Kuhlke et al. |
| 2013/0135198 A1* | 5/2013 | Hodge ............... H04N 21/4436 345/156 |
| 2013/0239206 A1 | 9/2013 | Draluk et al. |
| 2014/0002496 A1 | 1/2014 | Lamb et al. |
| 2014/0028542 A1 | 1/2014 | Lovitt et al. |
| 2014/0181910 A1 | 6/2014 | Fingal et al. |
| 2014/0185499 A1 | 7/2014 | Ray et al. |
| 2014/0189524 A1 | 7/2014 | Murarka et al. |
| 2014/0201844 A1* | 7/2014 | Buck .................... G06F 21/554 726/26 |
| 2014/0297817 A1 | 10/2014 | Thikkalveettil et al. |
| 2015/0070516 A1 | 3/2015 | Shoemake et al. |
| 2015/0113666 A1 | 4/2015 | Buck |
| 2015/0317295 A1 | 11/2015 | Sherry et al. |
| 2017/0006160 A1 | 1/2017 | Marya et al. |
| 2018/0083978 A1 | 3/2018 | Pantazelos |
| 2018/0096113 A1 | 4/2018 | Hassan et al. |
| 2018/0157457 A1 | 6/2018 | Paramashivaiah et al. |
| 2018/0285592 A1 | 10/2018 | Sharifi et al. |
| 2020/0019716 A1 | 1/2020 | Leonard et al. |
| 2020/0050777 A1 | 2/2020 | Rakshit et al. |
| 2020/0066046 A1 | 2/2020 | Stahl et al. |
| 2020/0159939 A1 | 5/2020 | Sun et al. |
| 2020/0159948 A1 | 5/2020 | Sun et al. |
| 2021/0303717 A1* | 9/2021 | Neves .................... G06F 3/013 |

OTHER PUBLICATIONS

Berger, Stefan , "Using Symbiotic Displays to View Sensitive Information in Public", Berger et al., "Using Symbiotic Displays to View Sensitive Information in Public," Proceedings of the 3rd IEEE Int'l Conf. on Pervasive Computing and Communications (PerCom 2005).

* cited by examiner

INTELLIGENT DISPLAY OF CONTENT

CROSS-REFERENCE TO RELATED APPLICATIONS

This application is a continuation of U.S. patent application Ser. No. 16/197,822, filed on Nov. 21, 2018, the disclosure of which is hereby incorporated by reference herein in its entirety.

BACKGROUND

The present disclosure relates to systems for intelligent display of content, and more particularly to systems and related processes for blocking or permitting presentation of content via a computing device based on one or more contextual factors, such as a personal work schedule, or detection of faces near the computing device, or whether digital content is being shared among multiple computing devices.

SUMMARY

Presentation of content, such as online advertisement content, video content, user-generated content, social media content, and/or other types of content, via computing devices can be an effective means of disseminating content among a desired audience or demographic. In some circumstances, however, such content may undesirably be presented via a computing device at an inappropriate time or location and/or within the view or earshot of an unintended recipient of the content. In view of the foregoing, the present disclosure provides systems and related processes that selectively block or permit presentation of content via a computing device based on one or more contextual factors, such as a personal work schedule, or whether a face is directed toward a display of the computing device, or whether the computing device is sharing digital content with another computing device.

In one example, the present disclosure provides an illustrative method for intelligent display of content based on detection of faces near a computing device. According to this method, a camera of a computing device, which may be a user-facing camera, such as a webcam, or another type of camera, captures an image of a face of a user within the camera's field of view. Based on the captured image, control circuitry determines whether the face, or at least a portion of the face, is directed toward a display of the computing device. In this manner, the control circuitry may determine whether the user's attention is directed toward the screen such that the user would notice content, such as an online advertisement, video content, user-generated content, social media content, and/or other types of content if the content were presented via the computing device. The control circuitry retrieves, from a memory, a rule specifying criteria for determining whether to block or permit presentation of content based on whether one or more faces are directed toward the display. Based on the rule and based on whether at least a portion of the face is directed toward the display, the control circuitry determines whether to block or permit the presentation of the content and blocks or permits the presentation of the content via the computing device based on a result of the determination.

In some examples, the control circuitry determines that the image includes no greater than one face, blocks the presentation of the content via the computing device if the face is not directed toward the display, and/or permits the presentation of the content via the computing device if the face is directed toward the display.

The captured image, in some circumstances, may include multiple faces, such as a face of a user of the computing device and a face of a bystander. In such circumstances, the control circuitry may determine a number of faces included in the captured image and block the presentation of the content via the computing device if the captured image includes more than one face. In this manner, the presentation of the content may occur only if no bystanders are present, thereby preventing the content from reaching an undesired audience. Additionally or alternatively, the control circuitry may determine whether the bystander's face is directed toward the computing device display and permit the presentation of the content via the computing device only if the user's face is directed toward the display and the bystander's face is not directed toward the display. For instance, if the user's face is not directed toward the display or if the bystander's face is directed toward the display, the control circuitry may block the presentation of the content via the computing device. In this manner, even if a bystander is present, the content may be presented to the user without being presented to the bystander.

In some of such embodiments, the control circuitry may be configured to delay presentation of the content. For example, the control circuitry may (1) store the content in memory, (2) determine, based on the rule and whether the user's face is directed toward the display, when to permit the presentation of the content via the computing device, and (3) permit the presentation of the content at the determined time. As another example, the control circuitry may determine that the image includes no greater than one face and delay the presentation of the content via the computing device until it is determined that the face is directed toward the display. In this manner, the content may be presented only when the user is paying attention, to ensure that the user experiences the content. As yet a further example, the control circuitry may determine a number of faces included in the captured image and delay the presentation of the content via the computing device until it is determined that the captured image includes no greater than one face, preventing the content from reaching an undesired audience.

The present disclosure also provides an illustrative method for intelligent display of content based on a personal work schedule. According to this method, control circuitry accesses a personal schedule via a calendar stored on a computing device, for instance, by using stored calendar access credentials and determines a current day and time, for example, based on a system clock of the computing device. The control circuitry then determines, based on the schedule, whether work is scheduled during the current day and time. The control circuitry retrieves, from a memory, a rule specifying criteria for determining whether to block or permit presentation of the content based on whether work is scheduled. Based on the rule and based on whether work is scheduled during the current day and time, the control circuitry determines whether to block or permit the presentation of the content via the computing device, and blocks or permits the presentation of the content via the computing device based on a result of the determination.

In some examples, the personal schedule includes one or more scheduled meetings, and the control circuitry determines whether work is scheduled during the current day and time by determining whether the one or more meetings are scheduled during the current day and time. In other examples, the personal schedule includes a list of work days and work hours, and the control circuitry determines whether work is scheduled during the current day and time by determining whether the work days and work hours coincide with the current day and time.

The control circuitry may, in some instances, block the presentation of the content via the computing device in response to determining that work is scheduled for the current day and time. Additionally or alternatively, the control circuitry may permit the presentation of the content via the computing device in response to determining that work is not scheduled for the current day and time.

In some of such embodiments, the control circuitry may be configured to delay presentation of the content. For instance, the control circuitry may delay the presentation of the content by (1) storing the content in memory; (2) determining, based on the rule retrieved from memory and based on whether work is scheduled during the current day and time, when to permit the presentation of the content via the computing device; and (3) permitting the presentation of the content at the determined time. Delaying the presentation of the content may also include blocking the presentation of the content while work is scheduled for the current day and time, determining a day and time for which work is not scheduled, and permitting the presentation of the content at the determined day and time for which work is not scheduled.

The present disclosure also provides an illustrative method for intelligent display of content based on whether digital content is being shared among multiple computing devices. According to this method, the control circuitry detects first digital content, such as an online advertisement, video content, user-generated content, social media content, and/or other types of content, to be presented via a computing device. The control circuitry then captures connectivity information from a communication port of the computing device and, based on the connectivity information, determines whether the computing device is sharing second digital content, such as computer video via desktop sharing and/or the like, with a second device via the communication port. The second device may be a display device, a projection device, a mobile computing device, a desktop computing device, and/or another type of device having its own communication port, and the communication port of the computing device and/or the communication port of the second device may be wired or wireless communication ports. In some aspects, the connectivity information may indicate that the communication port of the computing device is coupled to the communication port of the second device. Additionally or alternatively, the connectivity information may indicate that the computing device is sharing, by way of the communication port and a communication network, the second digital content with one or multiple second devices.

The control circuitry retrieves, from a memory, a rule specifying criteria for determining whether to block or permit presentation of the first digital content based on whether the computing device is sharing the second digital content. Based on the rule and based on whether the computing device is sharing the second digital content, the control circuitry determines whether to block or permit the presentation of the first digital content via the computing device and blocks or permits the presentation of the first digital content via the computing device based on a result of that determination. For instance, the control circuitry may block the presentation of the first digital content via the computing device when the computing device is sharing the second digital content with the second device, preventing a user of the second device from receiving the first digital content. In various aspects, blocking the presentation of the first digital content may include blocking the retrieval, receipt, and/or outputting of the first digital content at the computing device. The control circuitry may permit the presentation of the first digital content via the computing device once the computing device is no longer sharing the second digital content with the second device.

As another example in such embodiments, the control circuitry may delay the presentation of the first digital content. For instance, the control circuitry may (1) store the first digital content in memory; (2) determine, based on the rule and whether the computing device is sharing the second digital content with the second device, when to permit the presentation of the first digital content via the computing device; and (3) permit the presentation of the first digital content based on the determination. Additionally or alternatively, the control circuitry may delay the presentation of the first digital content by (1) blocking presentation of the first digital content while the computing device is sharing the second digital content with the second device; (2) determining when the computing device has ceased sharing the second digital content with the second device; and (3) permitting presentation of the first digital content in response to determining that the computing device has ceased sharing the second digital content with the second device.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
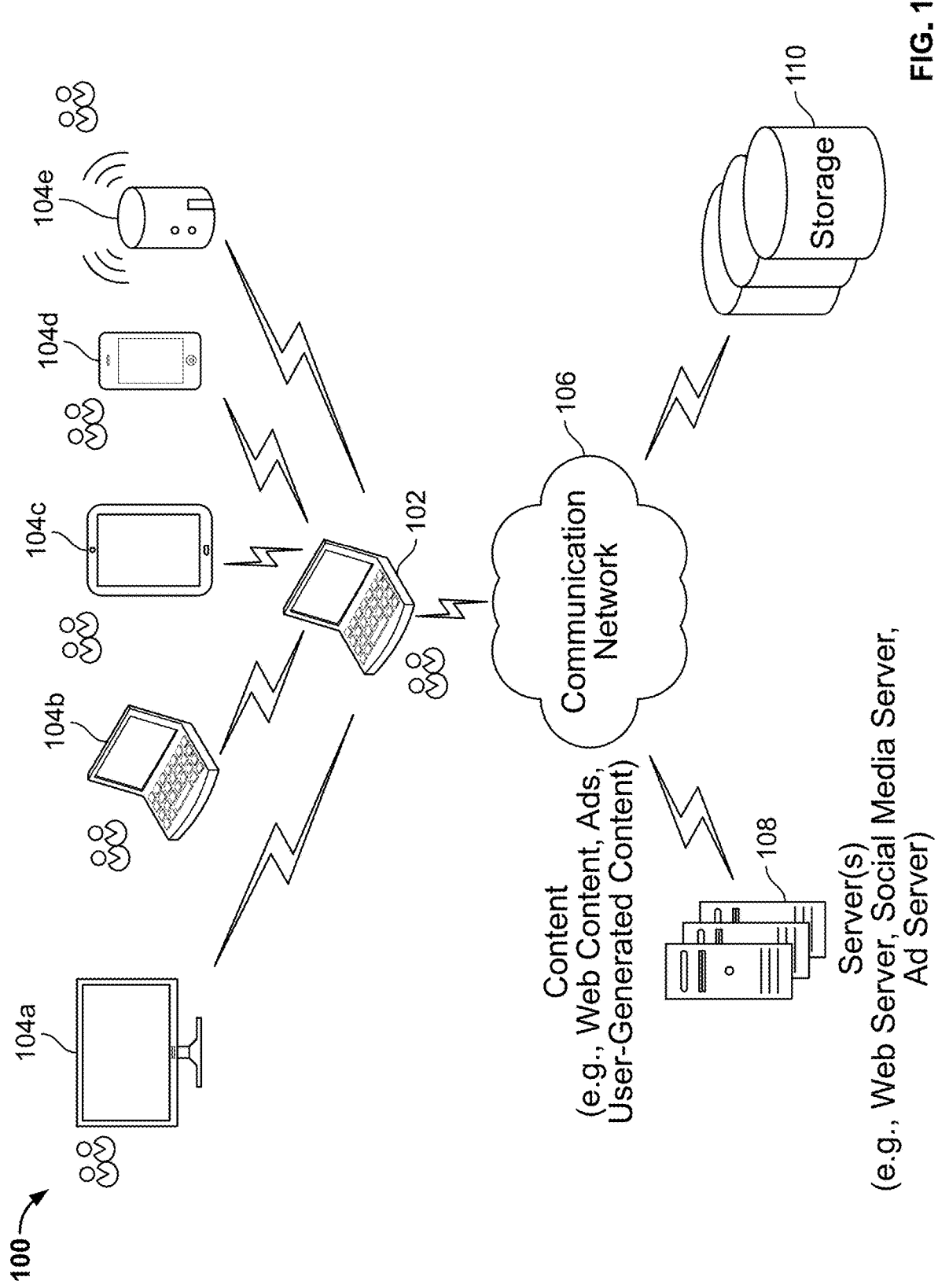
FIG. 1 shows an illustrative block diagram of a system for intelligent display of content, in accordance with some embodiments of the disclosure.

FIG. 1 shows an illustrative block diagram of a system 100 for intelligent display of content, in accordance with some embodiments of the disclosure. In one aspect, the system 100 includes computing device 102, one or more of a variety of other computing devices 104*a*, 104*b*, 104*c*, 104*d*, 104*e* (collectively, 104), communication network 106, one or more servers 108, and storage 110. Computing devices 102 and/or 104 may be a laptop, a display, a tablet, a smartphone, a smartspeaker or another type of computing device. In various circumstances, computing device 102 may be communicatively coupled (e.g., wirelessly or via wires) to one or more of computing devices 104, and/or may be communicatively coupled to servers 108 or storage 110 via communication network 106. Servers 108 may include web servers, social media servers, online advertisement servers, and/or other types of servers. Servers 108 may be configured to deliver to computing device 102 content, such as online advertisement content, video content, user-generated content, social media content, and/or other types of content, for presentation by computing device 102. However, one or more bystanders may be located sufficiently close to computing device 102 to enable the bystanders to experience such content presented via a display or speakers of computing device 102, which may be undesirable for the user of computing device 102. Additionally or alternatively, during screen sharing among computing device 102 and one or more of computing devices 104, users of computing devices 104 may undesirably experience such content.

Figure 2:
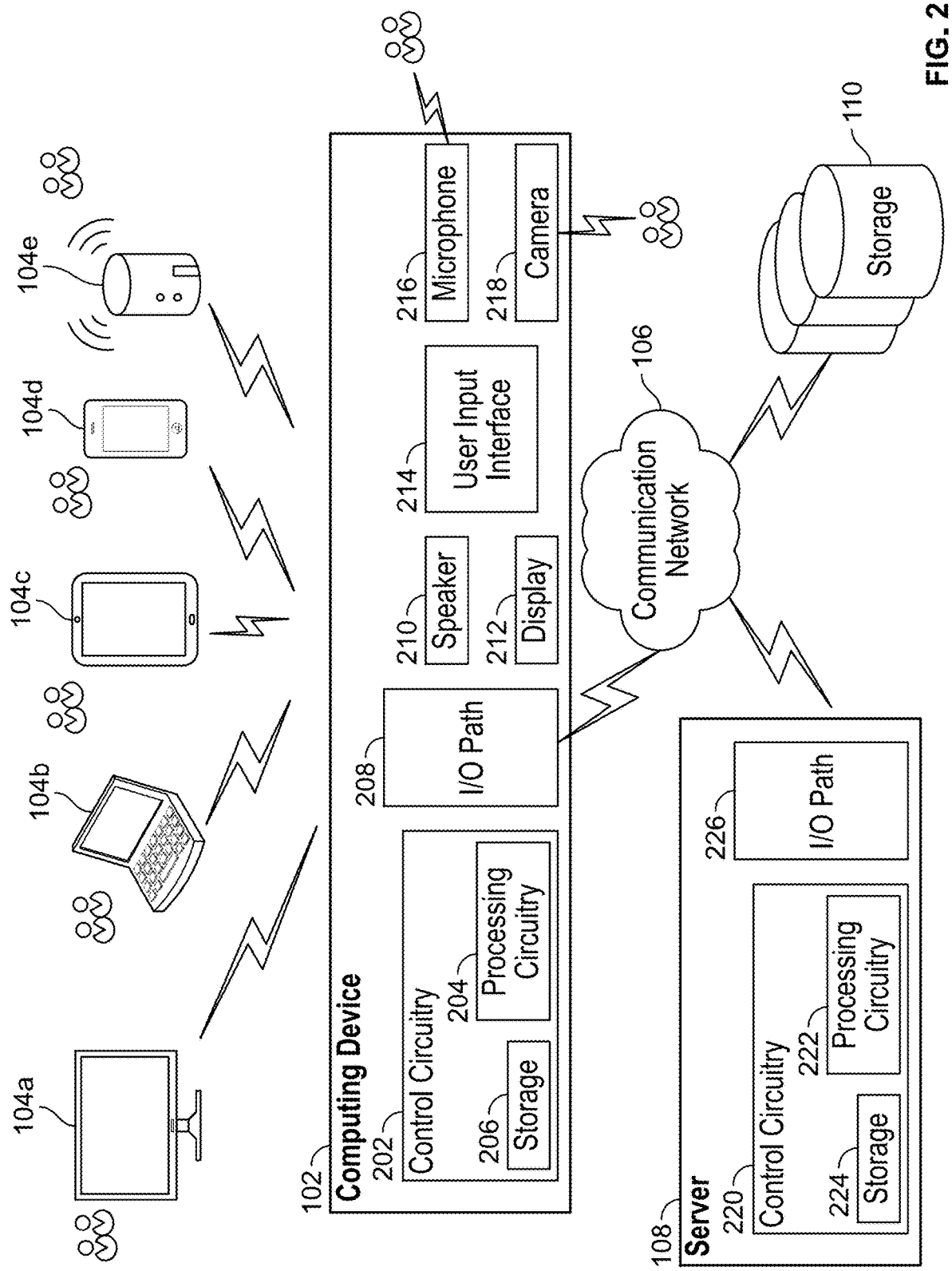
FIG. 2 is an illustrative block diagram showing additional details of the system for intelligent display of content of FIG. 1, in accordance with some embodiments of the disclosure.

FIG. 2 is an illustrative block diagram showing additional details of the system 100 for intelligent display of content of FIG. 1, in accordance with some embodiments of the disclosure. In particular, computing device 102 includes control circuitry 202, I/O path 208, speaker 210, display 212, user input interface 214, microphone 216, and camera 218. Control circuitry 202 of computing device 102 includes processing circuitry 204 and storage 206. Server 108 includes control circuitry 220 and I/O path 226. Control circuitry 220 of server 108 includes processing circuitry 222 and storage 224. Control circuitry 202 and/or 220 may be based on any suitable processing circuitry such as processing circuitry 204 and/or 222. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 202 and/or 220 executes instructions for an application stored in memory (e.g., storage 206 and/or 224). Specifically, control circuitry 202 and/or 220 may be instructed by the application to perform the functions discussed above and below. In some implementations, any action performed by control circuitry 202 and/or 220 may be based on instructions received from the application. For example, the application may be implemented as software or a set of executable instructions that may be stored in storage 206 and/or 224 and executed by control circuitry 202 and/or 220. In some embodiments, the application may be a client/server application where only a client application resides on computing device 102, and a server application resides on server 108.

The application may be implemented using any suitable architecture. For example, it may be a stand-alone application wholly implemented on computing device 102. In such an approach, instructions of the application are stored locally (e.g., in storage 206), and data for use by the application is downloaded on a periodic basis (e.g., from an out-of-band feed, from an Internet resource, or using another suitable approach). Control circuitry 202 may retrieve instructions of the application from storage 206 and process the instructions to perform the functionality described herein. Based on the processed instructions, control circuitry 202 may determine what action to perform when input is received from user input interface 214.

In client/server-based embodiments, control circuitry 202 may include communications circuitry suitable for communicating with an application server (e.g., server 108) or other networks or servers. The instructions for carrying out the functionality described herein may be stored on the application server. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication networks or paths.

A user may send instructions to control circuitry 202 and/or 220 using user input interface 214. User input interface 214 may be any suitable user interface, such as a remote control, trackball, keypad, keyboard, touchscreen, touchpad, stylus input, joystick, voice recognition interface, or other user input interfaces. User input interface 214 may be integrated with or combined with display 212, which may be a monitor, a television, a liquid crystal display (LCD) for a mobile device or automobile, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

Figure 3:
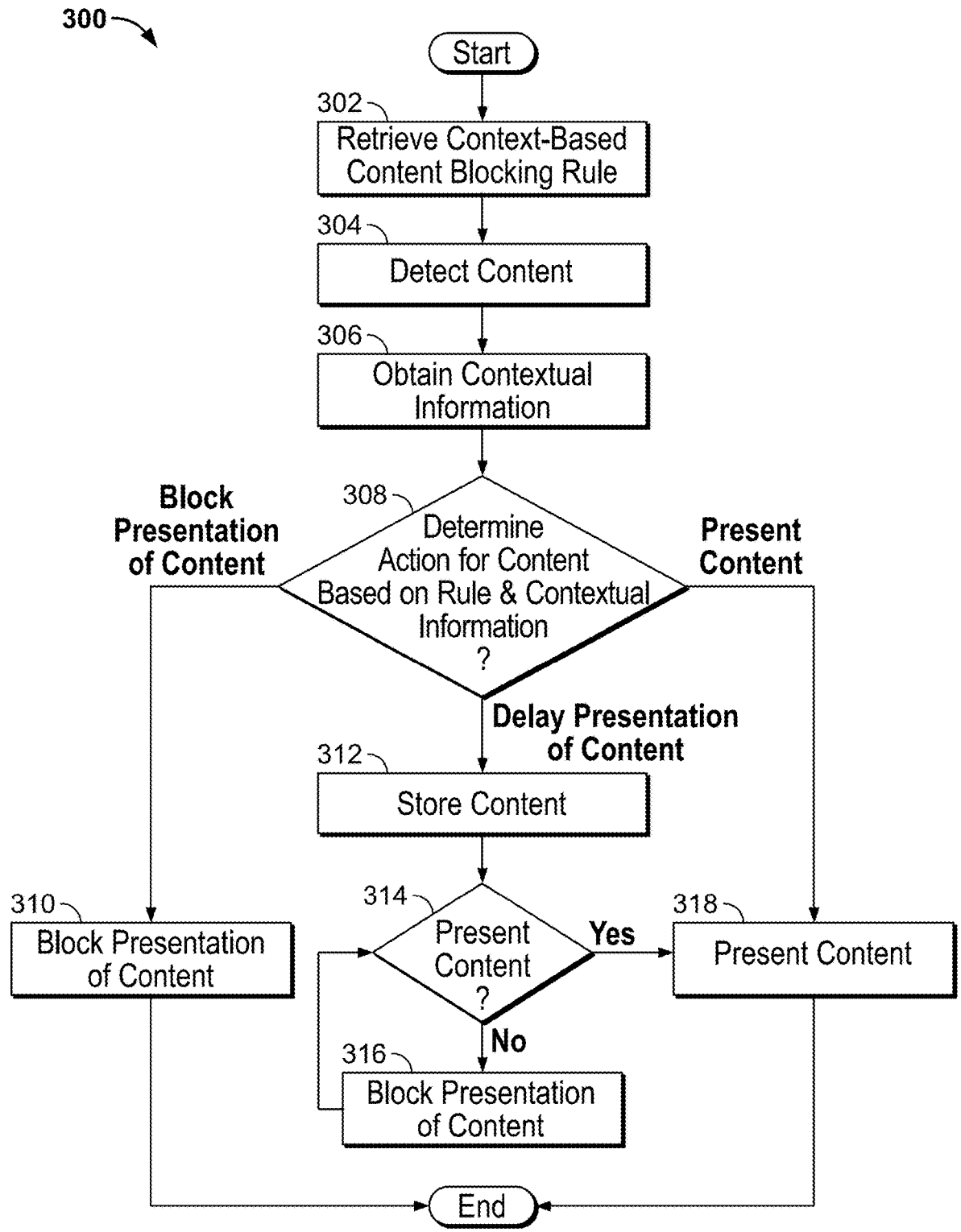
FIG. 3 depicts an illustrative flowchart of a process for intelligent display of content, in accordance with some embodiments of the disclosure.

Having described the system 100 for intelligent display of content, reference is now made to FIG. 3, which depicts an illustrative flowchart of a process 300 for intelligent display of content that may be implemented by using system 100, in accordance with some embodiments of the disclosure. At 302, processing circuitry 204 retrieves a context-based content-blocking rule from storage 206. The rule may be, for example, a default rule or a user-configured rule that a user can configure by way of one or more user interfaces, such as the user interfaces described below in the context of FIGS. 4 through 8. Example types of rules that processing circuitry 204 may retrieve at 302 include, without limitation, a rule specifying criteria for determining whether to block or permit presentation of content based on whether one or more faces are directed toward the display, a rule specifying criteria for determining whether to block or permit presentation of content based on whether work is scheduled, a rule specifying criteria for determining whether to block or permit presentation of the first digital content based on whether the computing device is sharing the second digital content, and/or the like. Additional details regarding the configuring of the rules that control circuitry 202 may obtain at 302 are provided below in the context of FIGS. 9 through 12.

At 304, control circuitry 202 detects content to be presented via computing device 102. For example, control circuitry 202 may detect the content at 304 by intercepting and parsing a webpage (e.g., received from server 108 via communication network 106), prior to its display via display 212, to identify any items of advertisement content, video content, or other types of content that may be embedded therein for display to the user. In this manner, control circuitry 202 may interact with web browser software being executed on computing device 102. Alternatively, in a server-based embodiment, the detecting of the content at 304 may be performed by control circuitry 220 of server 108, before delivering the webpage to computing device 102 via communication network 106.

At 306, control circuitry 202 obtains one or more types of contextual information for controlling display of content. Example types of contextual information that control circuitry 202 may obtain at 306 include, by way of example and without limitation, information relating to the detection of the presence of one or more people by computing device 102, information relating to the detection of one or more faces by computing device 102, information relating to a personal work schedule, information relating to whether digital content is being shared among multiple computing devices, and/or the like. Additional details regarding how control circuitry 202 may obtain the contextual information at 306 are provided below in the context of FIGS. 13 through 16.

At 308, based on the rule retrieved at 302 and the contextual information obtained at 306, control circuitry 202 determines an action to take to control display of the content detected at 304. Example types of actions that control circuitry 202 may determine to take at 308 may include, without limitation, presenting the content, blocking presentation of the content, or delaying presentation of the content. If control circuitry 202 determines that presentation of the content should be blocked ("Block Presentation of Content" at 308), then at 310 control circuitry 202 blocks presentation of the content. The blocking of the content at 310 may include blocking the retrieval or receipt of the content (e.g., from server 108 or storage 110 via communication network 106 or from another source) and/or blocking the outputting of the content at computing device 102. If control circuitry 202 determines that the content may be presented ("Present Content" at 308), then at 318 control circuitry 202 presents the content, for example, via display 212, speaker 210, and/or the like.

If control circuitry 202 determines to delay presentation of the content ("Delay Presentation of Content" at 308), then at 312 control circuitry 202 stores the content, at least temporarily, in storage 206 or another storage location for presentation after a delay. At 314, control circuitry 202 determines whether it is time to present the content. Control circuitry 202 makes this determination by retrieving updated contextual information (as described above at 306) and applying the updated contextual information to the rule retrieved at 302 to make another determination (as described above at 308) as to whether the content detected at 304 may be presented. If control circuitry 202 determines that the content may be presented ("Yes" at 314), then at 318 control circuitry 202 presents the content, for example, via display 212, speaker 210, and/or the like. If control circuitry 202 determines that the content may not yet be presented ("No" at 314), then at 316 control circuitry 202 blocks the presentation of the content via computing device 102 and passes control back to 314 to repeat the process described above (e.g., periodically) to determine when the content may be presented via computing device 102.

Figure 4:
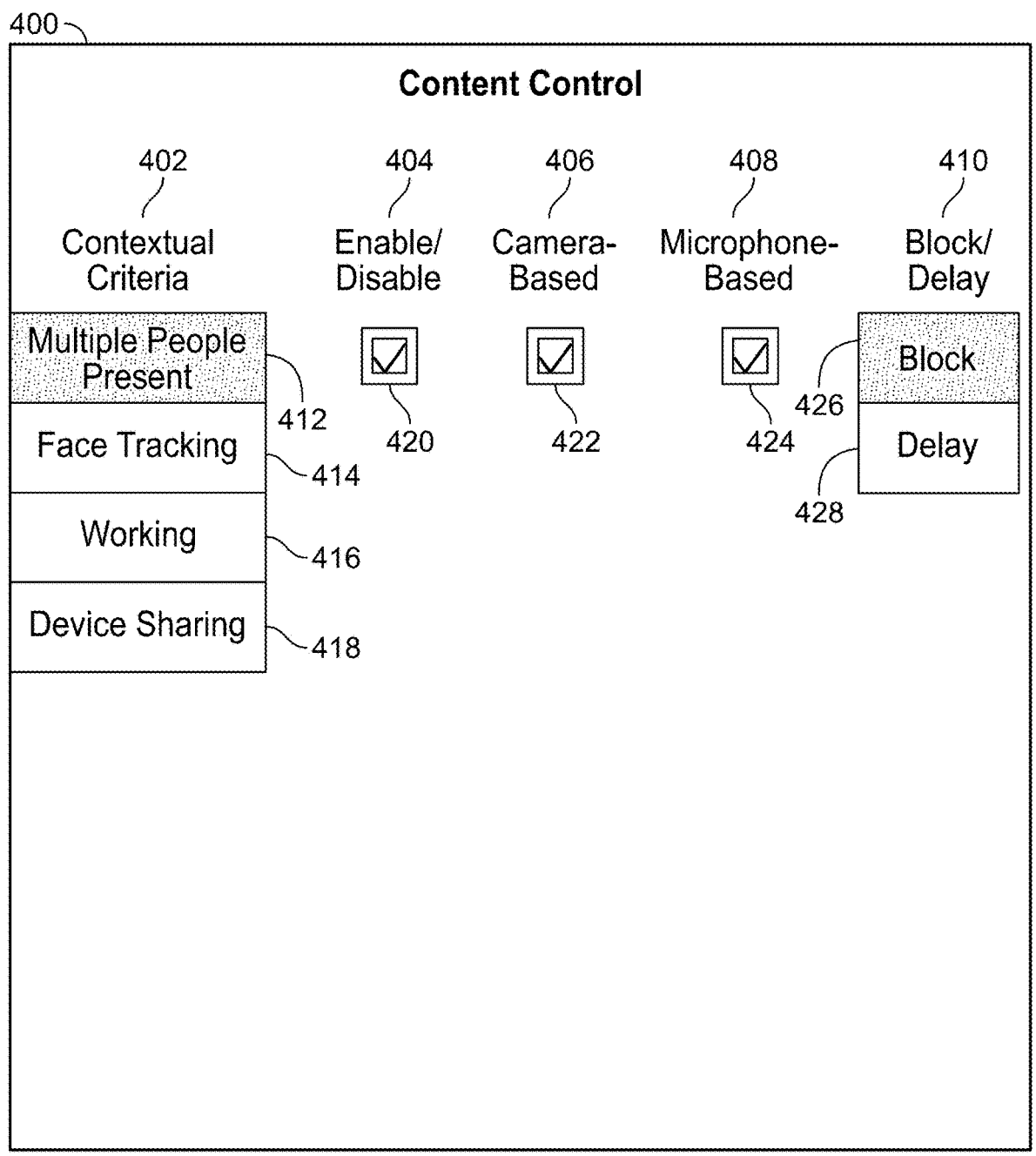
FIG. 4 shows a view of an example user interface for controlling display of content based on the presence of multiple people, in accordance with some embodiments of the disclosure.

FIG. 4 shows a view of an example user interface 400 for controlling display of content based on the presence of multiple people, in accordance with some embodiments of the disclosure. User interface 400 includes a variety of contextual criteria icons 402, namely icon 412 ("Multiple People Present"), icon 414 ("Face Tracking"), icon 416 ("Working"), and icon 418 ("Device Sharing"), each of which is selectable to cause a corresponding set of menu options to appear in the right portion of user interface 400. In user interface 400, icon 412 is selected, which causes the following menu options to appear: checkbox 420 beneath column 404 ("Enable/Disable"), checkbox 422 beneath column 406 ("Camera-Based"), checkbox 424 beneath column 408 ("Microphone-Based"), and a dropdown menu including a block option 426 and a delay option 428, beneath column 410 ("Block/Delay"). Once icon 412 is selected, the user can select (e.g., toggle) checkbox 420 to enable or disable the rule for controlling display of content based on the presence of multiple people. Once checkbox 420 is selected (enabling the rule), the user may select (e.g., toggle) checkbox 422 to enable or disable a camera-based mode of detecting the presence of multiple people. Additionally or alternatively, the user may select (e.g., toggle) checkbox 424 to enable or disable a microphone-based mode of detecting the presence of multiple people. Finally, the user may select either block option 426 or delay option 428 to configure the rule to dictate whether content will be blocked or delayed based on the presence of multiple people when detected via camera and/or microphone.

Figure 5:
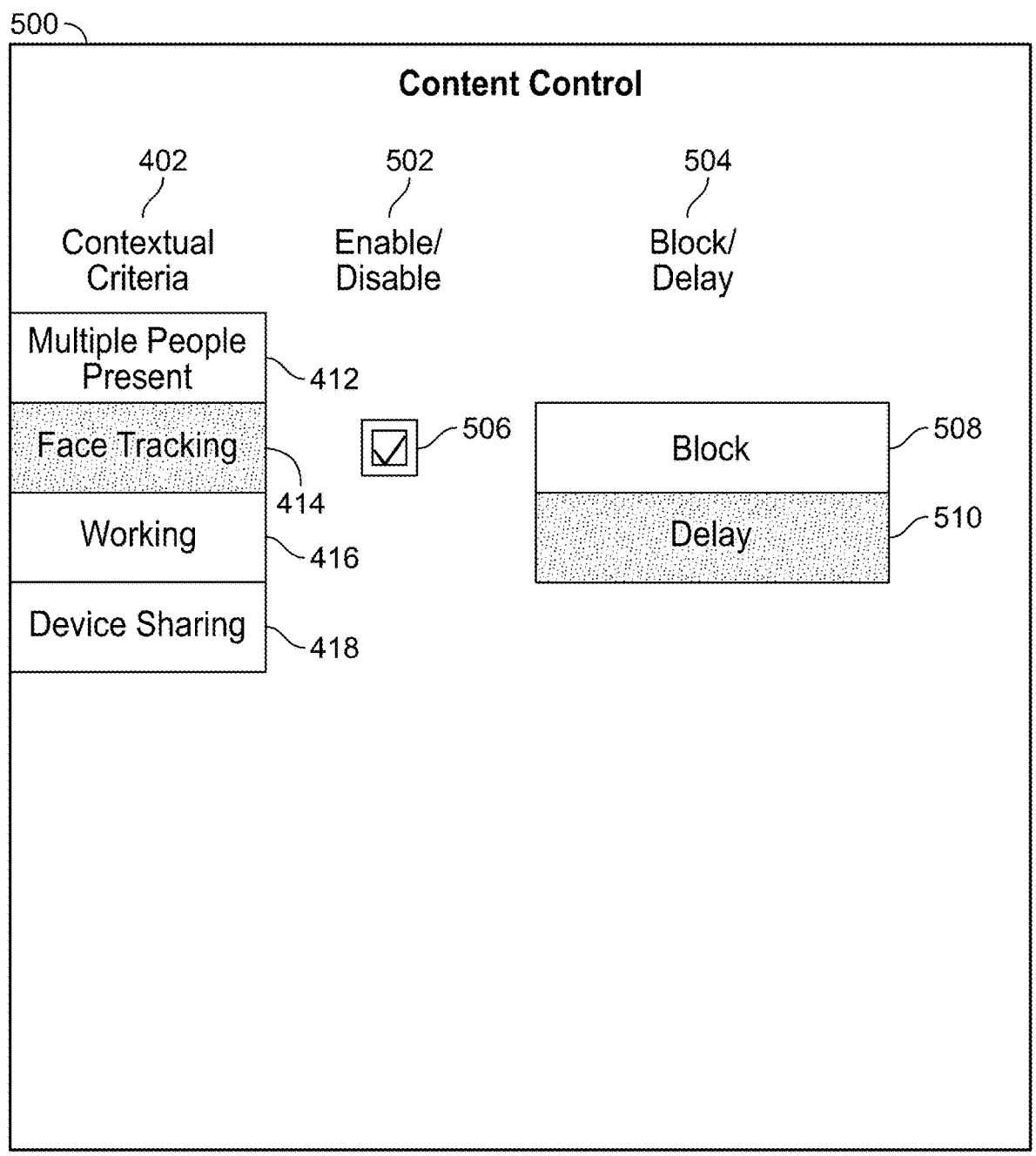
FIG. 5 shows a view of an example user interface for controlling display of content based on face detection, in accordance with some embodiments of the disclosure.

FIG. 5 shows a view of an example user interface 500 for controlling display of content based on face detection via computing device 102, in accordance with some embodiments of the disclosure. User interface 500 includes the same variety of contextual criteria icons 402 described above in the context of user interface 400, except in user interface 500, icon 414 ("Face Tracking") is selected instead of icon 412, which causes the following menu options to appear: checkbox 506 beneath column 502 ("Enable/Disable") and a dropdown menu including a block option 508 and a delay option 510, beneath column 504 ("Block/Delay"). Once icon 414 is selected, the user can select (e.g., toggle) checkbox 506 to enable or disable the rule for controlling display of content based on face detection. Once checkbox 506 is selected (enabling the rule), the user may select either block option 508 or delay option 510 to configure the rule to dictate whether content will be blocked or delayed based on the detection of faces via computing device 102.

Figure 6:
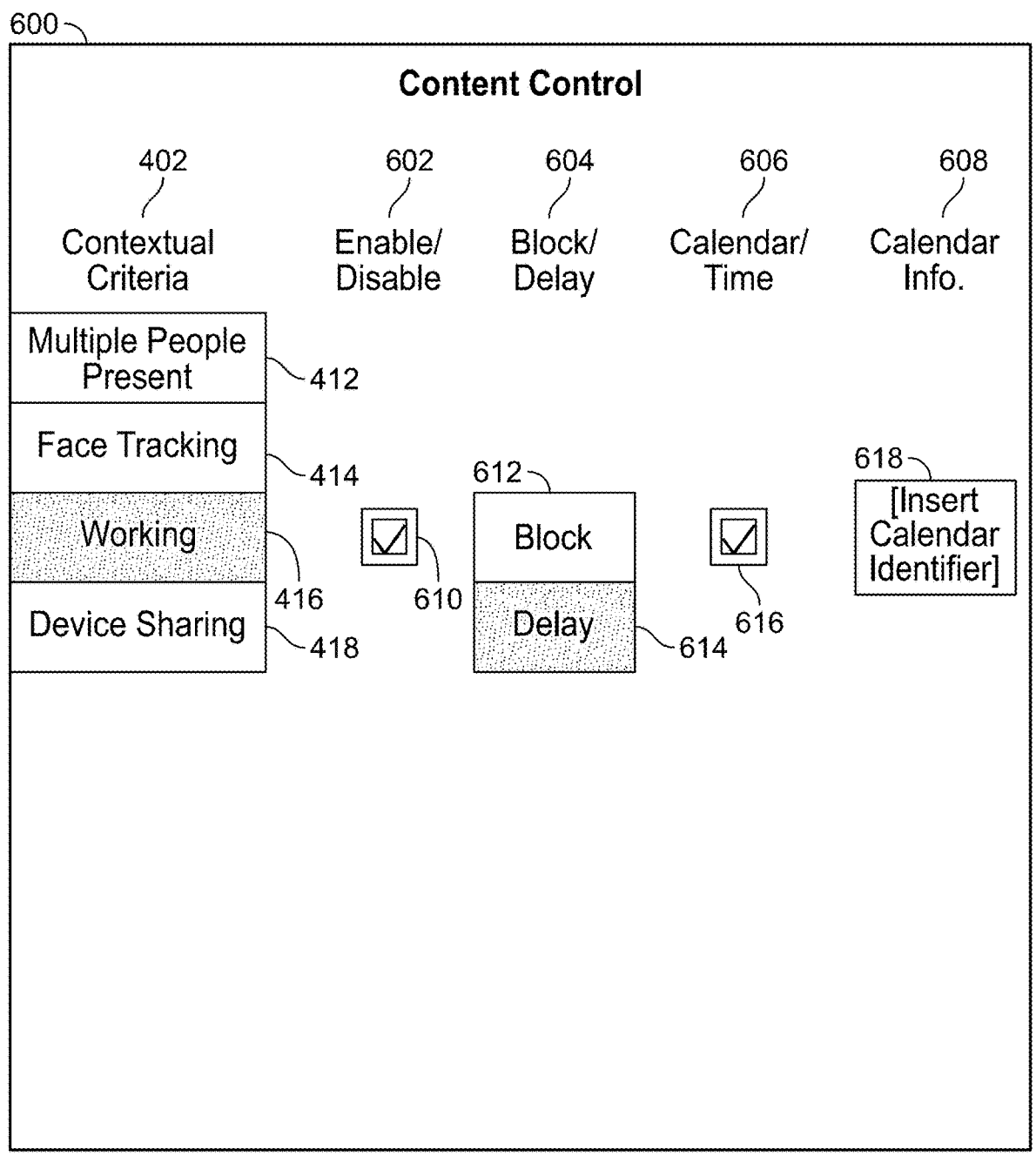
FIG. 6 shows a view of an example user interface for controlling display of content based on a personal work schedule, in accordance with some embodiments of the disclosure.

FIG. 6 shows a view of an example user interface 600 for controlling display of content based on a personal work schedule, in accordance with some embodiments of the disclosure. User interface 600 includes the same variety of contextual criteria icons 402 described above in the context of user interface 400, except in user interface 600, icon 416 ("Working") is selected instead of icon 412, which causes the following menu options to appear: checkbox 610 beneath column 602 ("Enable/Disable"), a dropdown menu including a block option 612 and a delay option 614, beneath column 604 ("Block/Delay"), checkbox 616 beneath column 606 ("Calendar/Time"), and data input field 618 beneath column 608 ("Calendar Info."). Once icon 416 is selected, the user can select (e.g., toggle) checkbox 610 to enable or disable the rule for controlling display of content based on a personal work schedule. Once checkbox 610 is selected (enabling the rule), the user may select either block option 612 or delay option 614 to configure the rule to dictate whether content will be blocked or delayed based on the personal work schedule. The user can also select (e.g., toggle) checkbox 616 to indicate whether the rule will be based on a calendar, such as a personal calendar stored in storage 206, or in storage 110, or elsewhere in association with a calendar account of the user. If the user selects checkbox 616 to indicate that the rule will be calendar-based, the user may enter calendar information, such as a calendar identifier, calendar access credentials, and/or the like, that enables control circuitry 202 to access the calendar for implementing the content control rule.

Figure 7:
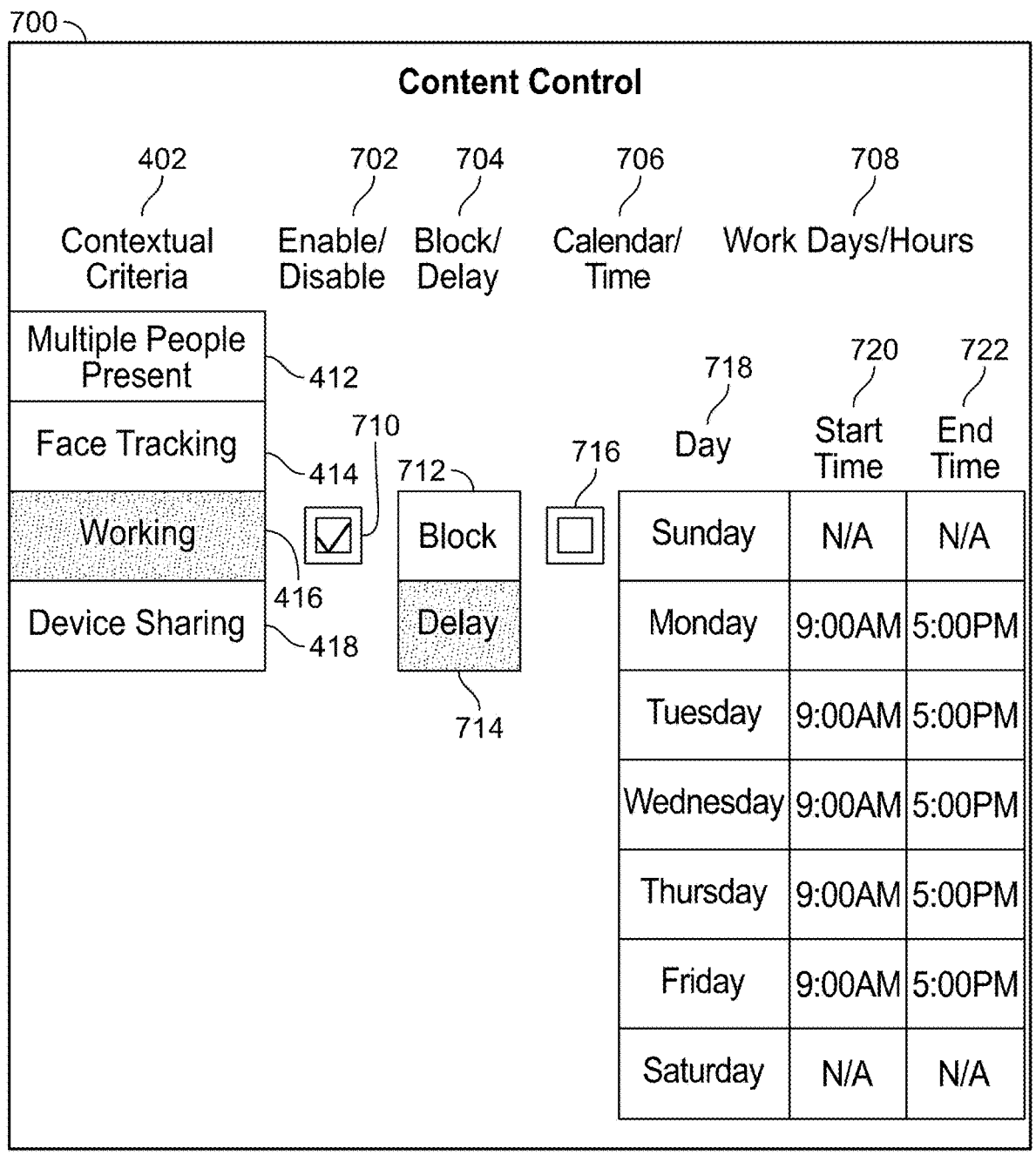
FIG. 7 shows a view of another example user interface for controlling display of content based on a personal work schedule, in accordance with some embodiments of the disclosure.

FIG. 7 shows a view of another example user interface for 700 controlling display of content based on a personal work schedule, in accordance with some embodiments of the disclosure. As in user interface 600, in user interface 700 icon 416 ("Working"), checkbox 710 shown beneath column 702 ("Enable/Disable") (which may correspond to checkbox 610 of user interface 600), and delay option 714 shown beneath column 704 ("Block/Delay") (which may correspond to checkbox 614 of user interface 600) are selected. However, unlike as in user interface 600, in user interface 700 checkbox 716 (which may correspond to checkbox 616 of FIG. 6) beneath column 706 ("Calendar/Time") is deselected, which causes day fields 718, start time fields 720, and end time fields 722 to be presented beneath column 708 ("Work Days/Hours"). The user may enter, in day fields 718, start time fields 720, and end time fields 722, days, start times, and end times, respectively, to define working hours within which content should be delayed in accordance with the selection of delay option 714 (or blocked in accordance with selection of block option 712). In this manner a user can keep their personal calendar private, while also indicating days and times during which content blocking should occur.

Figure 8:
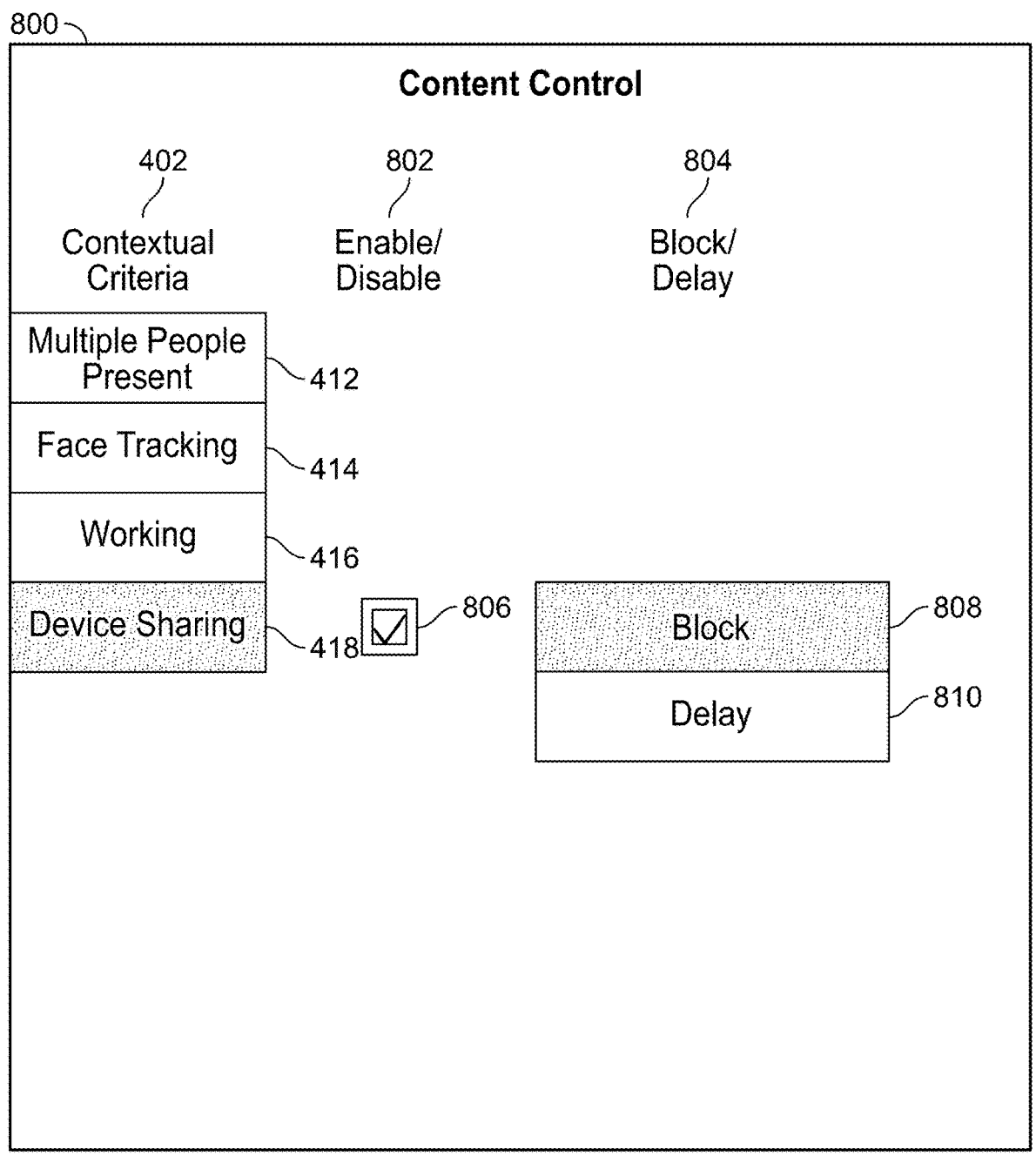
FIG. 8 shows a view of an example user interface for controlling display of content based on whether digital content is being shared among multiple computing devices, in accordance with some embodiments of the disclosure.

FIG. 8 shows a view of an example user interface 800 for controlling display of content based on whether digital content is being shared among multiple computing devices, in accordance with some embodiments of the disclosure. User interface 800 includes the same variety of contextual criteria icons 402 described above in the context of user interface 400, except in user interface 800, icon 418 ("Device Sharing") is selected instead of icon 412, which causes the following menu options to appear: checkbox 806 beneath column 802 ("Enable/Disable") and a dropdown menu including a block option 808 and a delay option 810, beneath column 804 ("Block/Delay"). Once icon 418 is selected, the user can select (e.g., toggle) checkbox 806 to enable or disable the rule for controlling display of content based on whether digital content is being shared among multiple computing devices. Once checkbox 806 is selected (enabling the rule), the user may select either block option 808 or delay option 810 to configure the rule to dictate whether content will be blocked or delayed based on whether computing device 102 is sharing digital content among multiple computing devices, such as computing devices 104.

Figure 9:
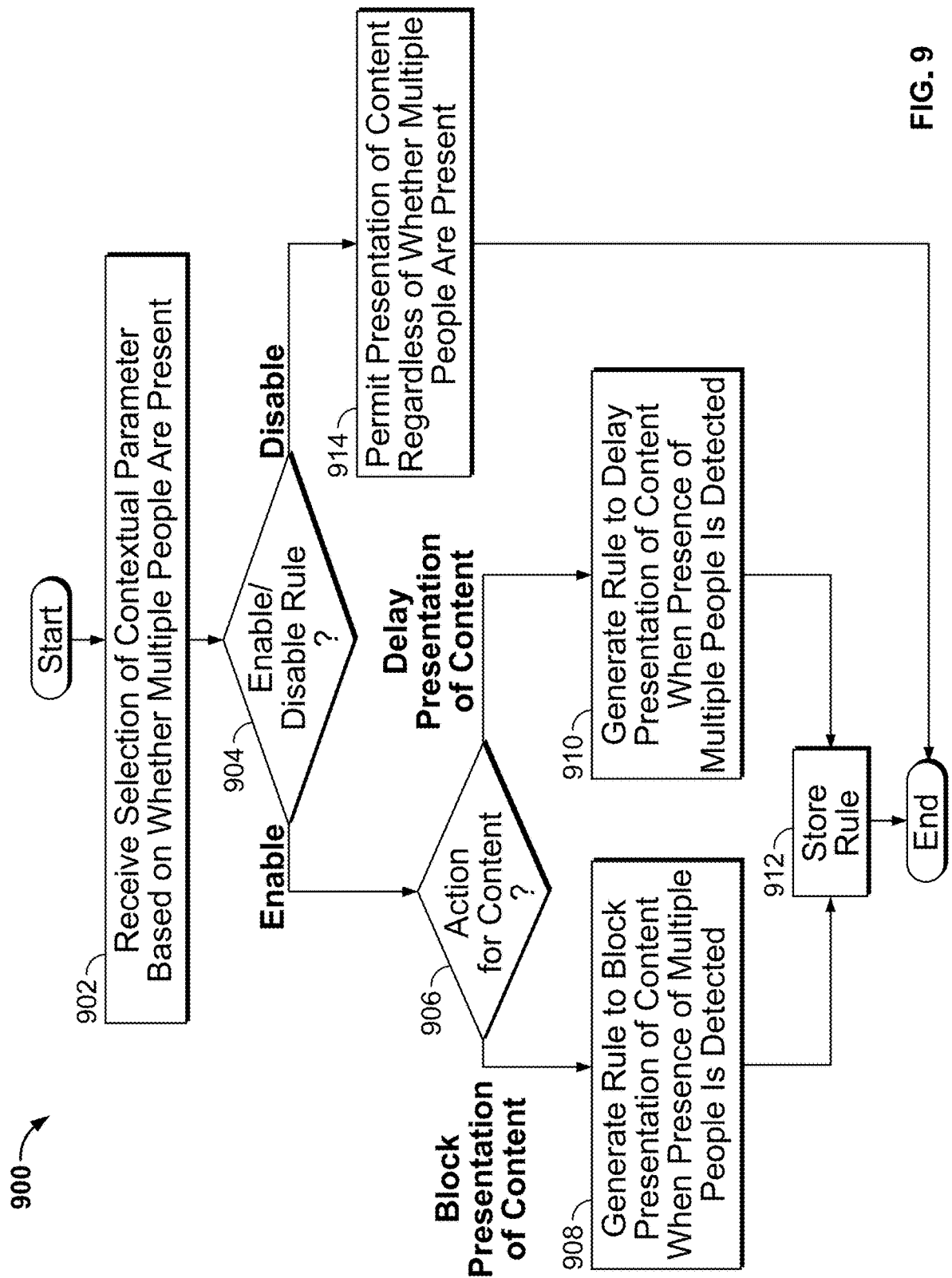
FIG. 9 is a flowchart of an illustrative process for configuring a rule for controlling display of content based on the presence of multiple people, in accordance with some embodiments of the disclosure.

FIG. 9 is a flowchart of an illustrative process 900 for configuring a rule for controlling display of content based on the presence of multiple people via computing device 102, in accordance with some embodiments of the disclosure. In some aspects, the user may configure the rule according to process 900 by using user interface 400 of FIG. 4, and control circuitry 202 may retrieve the configured rule at 302 as part of process 300 (FIG. 3). At 902, control circuitry 202 receives the selection of icon 412 to enable configuration of the rule for controlling display of content based on the presence of multiple people. At 904, control circuitry 202 receives a selection or a deselection of checkbox 420 to enable or disable the rule, respectively. If control circuitry 202 receives a deselection of checkbox 420 ("Disable" at 904), then at 914 control circuitry 202 disables the rule, thereby permitting presentation of content regardless of whether the presence of multiple people is detected. If control circuitry 202 receives a selection of checkbox 420 ("Enable" at 904), then at 906 control circuitry 202 receives a selection of block option 426 or delay option 428 to enable the blocking or delaying, respectively, of the presentation of the content based on the detection of multiple people via computing device 102. If control circuitry 202 receives selection of block option 426 ("Block Presentation of Content" at 906), then at 908, control circuitry 202 generates the rule specifying to block presentation of content when the presence of multiple people is detected. If control circuitry 202 receives selection of delay option 428 ("Delay Presentation of Content" at 906), then at 910, control circuitry 202 generates the rule specifying to delay presentation of content when the presence of multiple people is detected. At 912, control circuitry 202 stores, for example in storage 206, the rule that was generated at 908 or 910 for later retrieval (e.g., at 302 of process 300 of FIG. 3) and use in controlling display of content based on the detection of the presence of multiple people via computing device 102. Although not separately shown in FIG. 9, in some embodiments, at 908 and/or 910, control circuitry 202 also receives selection of checkbox 422 and/or checkbox 424 to indicate whether detection of the presence of people is to be performed via camera 218 and/or microphone 216. In such embodiments, control circuitry 202 generates the rule based on the selection of checkbox 422 and/or checkbox 424 for storage at 912.

Figure 10:
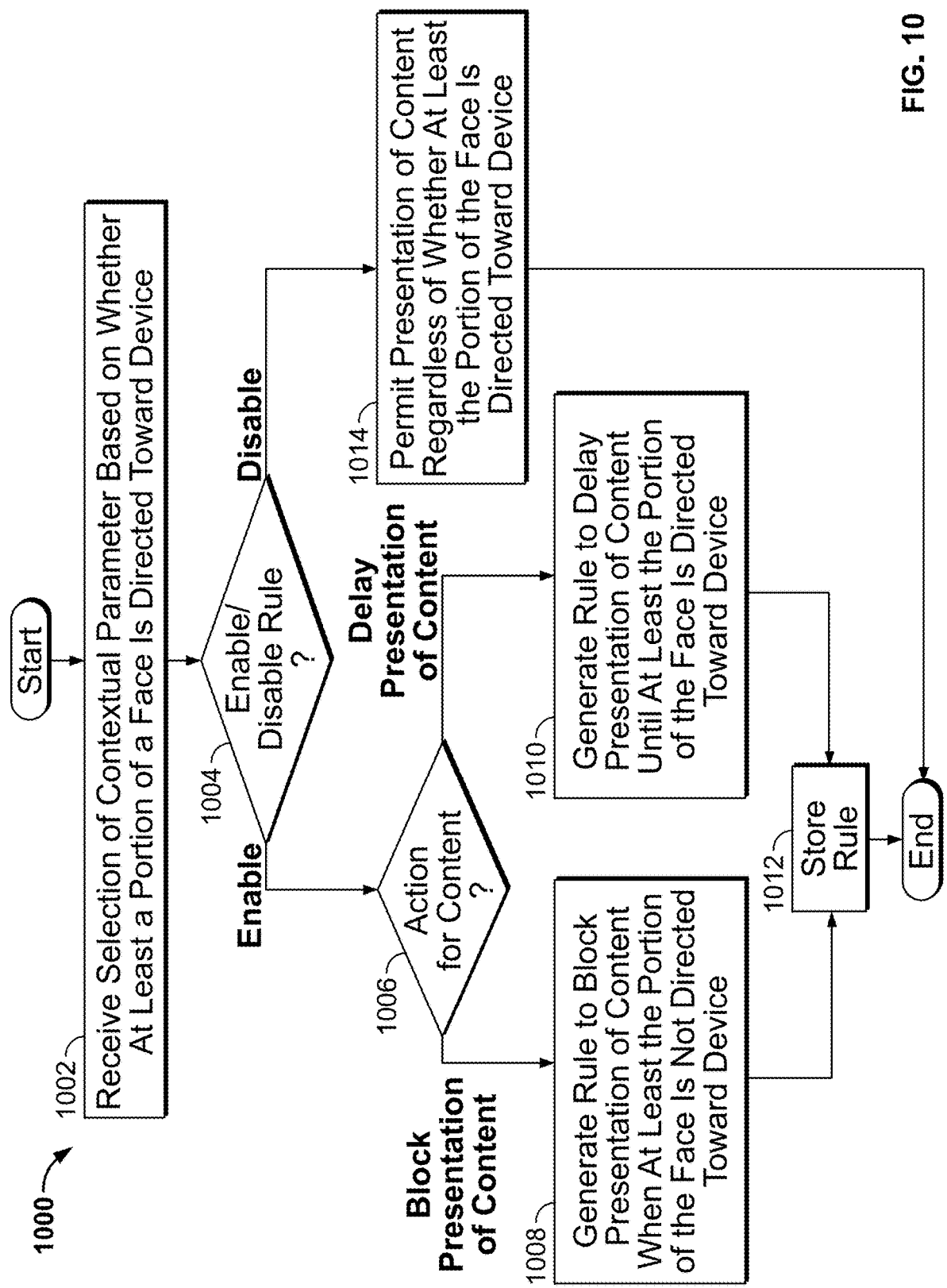
FIG. 10 is a flowchart of an illustrative process for configuring a rule for controlling display of content based on face detection, in accordance with some embodiments of the disclosure.

FIG. 10 is a flowchart of an illustrative process 1000 for configuring a rule for controlling display of content based on face detection via computing device 102, in accordance with some embodiments of the disclosure. In some aspects, the user may configure the rule according to process 1000 by using user interface 500 of FIG. 5, and control circuitry 202 may retrieve the configured rule at 302 as part of process 300 (FIG. 3). At 1002, control circuitry 202 receives the selection of icon 414 to enable configuration of the rule for controlling display of content based on face detection. At 1004, control circuitry 202 receives a selection or a deselection of checkbox 506 to enable or disable the rule, respectively. If control circuitry 202 receives a deselection of checkbox 506 ("Disable" at 1004), then at 1014 control circuitry 202 disables the rule, thereby permitting presentation of content regardless of whether any faces are detected via computing device 102. If control circuitry 202 receives a selection of checkbox 506 ("Enable" at 1004), then at 1006 control circuitry 202 receives a selection of block option 508 or delay option 510 to enable the blocking or delaying, respectively, of the presentation of the content based on the face detection via computing device 102. If control circuitry 202 receives selection of block option 508 ("Block Presentation of Content" at 1006), then at 1008, control circuitry 202 generates the rule specifying to block presentation of content when at least a portion of a detected face (e.g., detected via camera 218) is not directed toward computing device 102 (e.g., toward display 212). In this manner, the presentation of the content may be blocked if the user is not directing their attention to the content. If control circuitry 202 receives selection of delay option 510 ("Delay Presentation of Content" at 1006), then at 1010, control circuitry 202 generates the rule specifying to delay presentation of content until at least a portion of the detected face is directed toward computing device 102 (e.g., toward display 212). At 1012, control circuitry 202 stores, for example in storage 206, the rule that was generated at 1008 or 1010 for later retrieval (e.g., at 302 of process 300 of FIG. 3) and use in controlling display of content based on face detection via computing device 102.

Figure 11:
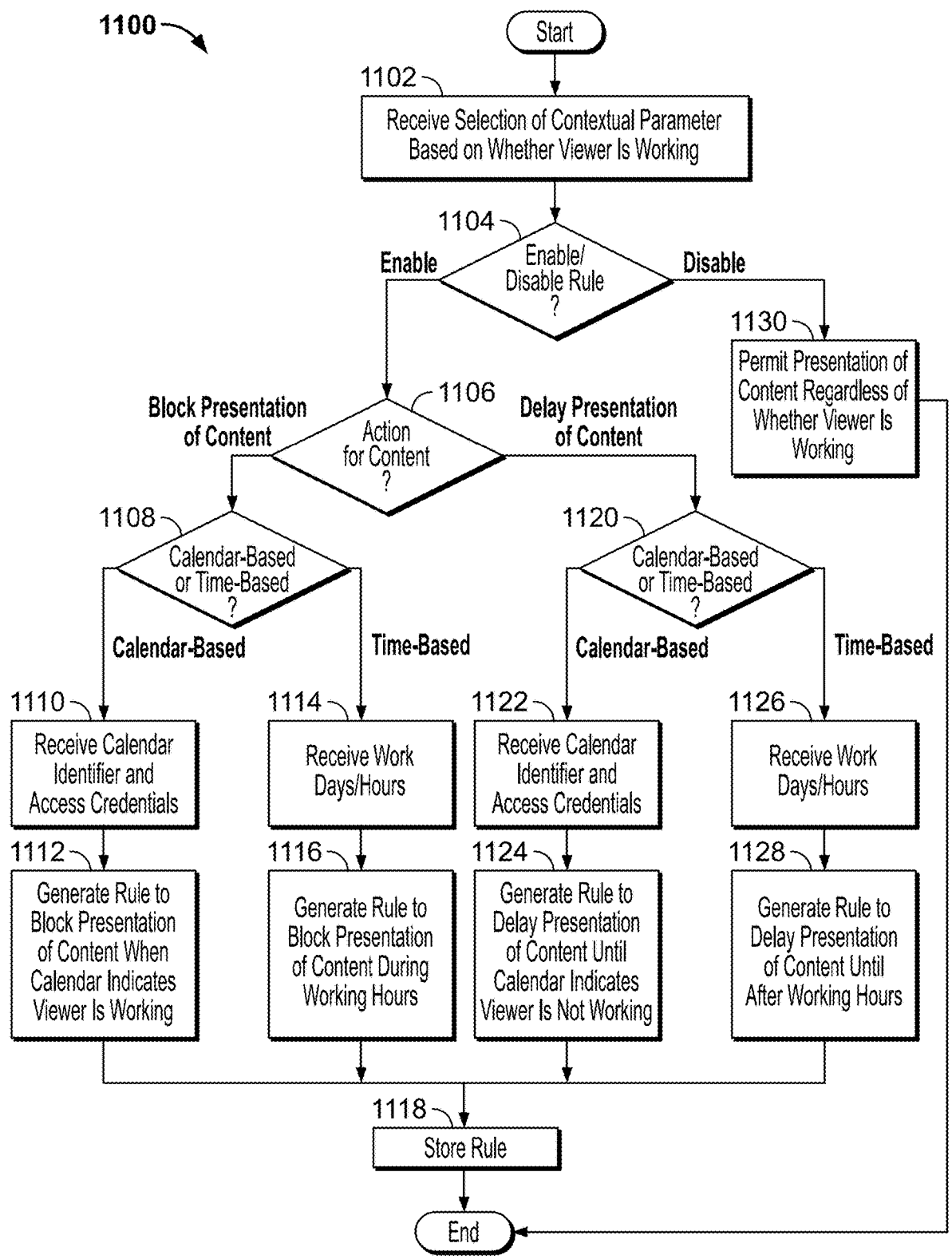
FIG. 11 is a flowchart of an illustrative process for configuring a rule for controlling display of content based on a personal work schedule, in accordance with some embodiments of the disclosure.

FIG. 11 is a flowchart of an illustrative process 1100 for configuring a rule for controlling display of content based on a personal work schedule, in accordance with some embodiments of the disclosure. In some aspects, the user may configure the rule according to process 1100 by using user interface 600 and/or 700 of FIGS. 6 and/or 7, respectively, and control circuitry 202 may retrieve the configured rule at 302 as part of process 300 (FIG. 3). At 1102, control circuitry 202 receives the selection of icon 416 to enable configuration of the rule for controlling display of content based on a personal work schedule. At 1104, control circuitry 202 receives a selection or a deselection of checkbox 610 (or 710) to enable or disable the rule, respectively. If control circuitry 202 receives a deselection of checkbox 610 (or 710) ("Disable" at 1104), then at 1130 control circuitry 202 disables the rule, thereby permitting presentation of content regardless of any personal work schedule. If control circuitry 202 receives a selection of checkbox 610 (or 710) ("Enable" at 1104), then at 1106 control circuitry 202 receives a selection of block option 612 (or 712) or delay option 614 (or 714) to enable the blocking or delaying, respectively, of the presentation of the content based on the personal work schedule.

If control circuitry 202 receives selection of block option 612 (or 712) ("Block Presentation of Content" at 1106), then at 1108, control circuitry 202 receives selection or deselection of checkbox 616 (or 716) to indicate whether the rule will be calendar-based or time-based. If control circuitry 202 receives selection of checkbox 616 (or 716) ("Calendar-based" at 1108), then at 1110 control circuitry 202 receives a calendar identifier and access credentials (e.g., login name and password) provided via data input field 618 and generates, at 1112, a rule to block presentation of content when a personal schedule in the calendar indicates that the user is working. If control circuitry 202 receives deselection of checkbox 616 (or 716) ("Time-based" at 1108), then at 1114 control circuitry 202 receives days, start times, and end times via day fields 718, start time fields 720, and end time fields 722, respectively, to define time frames (e.g., working hours) within which content should be blocked. At 1116, control circuitry 202 generates a rule to block presentation of content according to the days, start times, and end times received at 1114.

If control circuitry 202 receives selection of delay option 614 (or 714) ("Delay Presentation of Content" at 1106), then at 1120, control circuitry 202 receives selection or deselection of checkbox 616 (or 716) to indicate whether the rule will be calendar-based or time-based. If control circuitry 202 receives selection of checkbox 616 (or 716) ("Calendar-based" at 1120), then at 1122 control circuitry 202 receives a calendar identifier and/or access credentials (e.g., login name and password) provided via data input field 618 and generates, at 1124, a rule to delay presentation of content until the personal schedule in the calendar indicates that the user is no longer working. If control circuitry 202 receives deselection of checkbox 616 (or 716) ("Time-based" at 1120), then at 1126 control circuitry 202 receives days, start times, and end times via day fields 718, start time fields 720, and end time fields 722, respectively, to define time frames (e.g., working hours) within which content should be delayed. At 1128, control circuitry 202 generates a rule to delay presentation of content until outside the days and hours indicated by the days, start times, and end times received at 1126.

At 1118, control circuitry 202 stores, for example in storage 206, the rule that was generated at 1112, 1116, 1124, or 1128 for later retrieval (e.g., at 302 of process 300 of FIG. 3) and use in controlling display of content based on a personal work calendar or specified time frames. In some aspects, control circuitry may also store at 1118 the calendar identifier, access credentials, and/or work days/hours received at 1110, 1122, or 1126, for example, in storage 206, for subsequent retrieval (e.g., at 302 of FIG. 3) and use in controlling display of content based on the personal work schedule included in the calendar.

Figure 12:
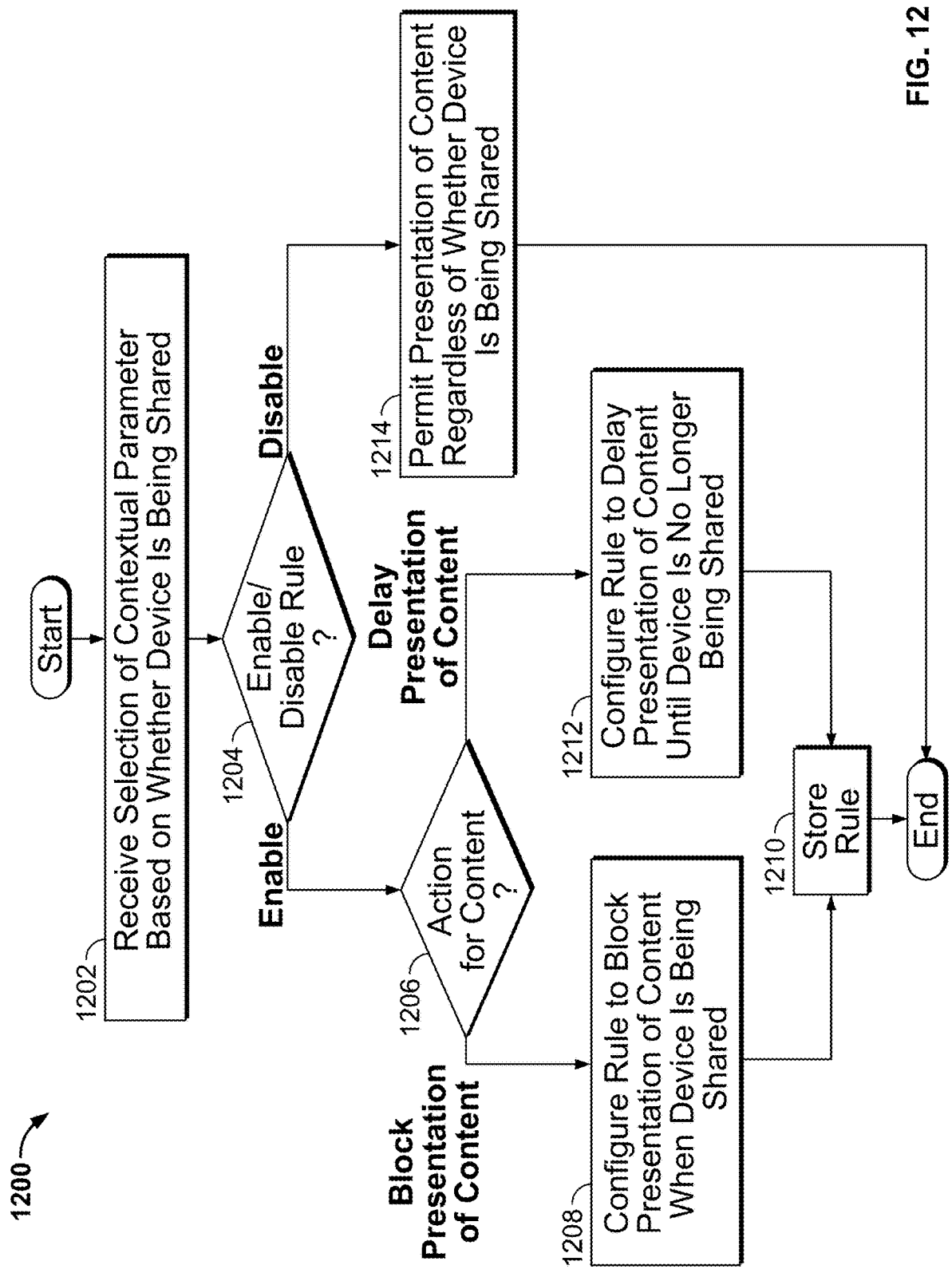
FIG. 12 is a flowchart of an illustrative process for configuring a rule for controlling display of content based on whether digital content is being shared among multiple computing devices, in accordance with some embodiments of the disclosure.

FIG. 12 is a flowchart of an illustrative process 1200 for configuring a rule for controlling display of content based on whether computing device 102 is sharing digital content among one or more other computing devices, such as computing devices 104, in accordance with some embodiments of the disclosure. In some aspects, the user may configure the rule according to process 1200 by using user interface 800 of FIG. 8, and control circuitry 202 may retrieve the configured rule at 302 as part of process 300 (FIG. 3). At 1202, control circuitry 202 receives the selection of icon 418 to enable configuration of the rule for controlling display of content based on content sharing. At 1204, control circuitry 202 receives a selection or a deselection of checkbox 806 to enable or disable the rule, respectively. If control circuitry 202 receives a deselection of checkbox 806 ("Disable" at 1204), then at 1214 control circuitry 202 disables the rule, thereby permitting presentation of content regardless of whether any content is being shared via computing device 102. If control circuitry 202 receives a selection of checkbox 806 ("Enable" at 1204), then at 1206 control circuitry 202 receives a selection of block option 808 or delay option 810 to enable the blocking or delaying, respectively, of the presentation of the content based on whether computing device 102 is sharing content with another device. If control circuitry 202 receives selection of block option 808 ("Block Presentation of Content" at 1206), then at 1208, control circuitry 202 generates the rule specifying to block presentation of content when computing device 102 is sharing content (e.g., screen sharing) with one or more of computing devices 104 or other computing devices. If control circuitry 202 receives selection of delay option 810 ("Delay Presentation of Content" at 1206), then at 1212, control circuitry 202 generates a rule specifying to delay presentation of content until computing device 102 is no longer sharing content (e.g., screen sharing) with one or more of computing devices 104 or other computing devices. At 1210, control circuitry 202 stores, for example in storage 206, the rule that was generated at 1208 or 1212 for later retrieval (e.g., at 302 of process 300 of FIG. 3) and use in controlling display of content based on content sharing via computing device 102.

Figure 13:
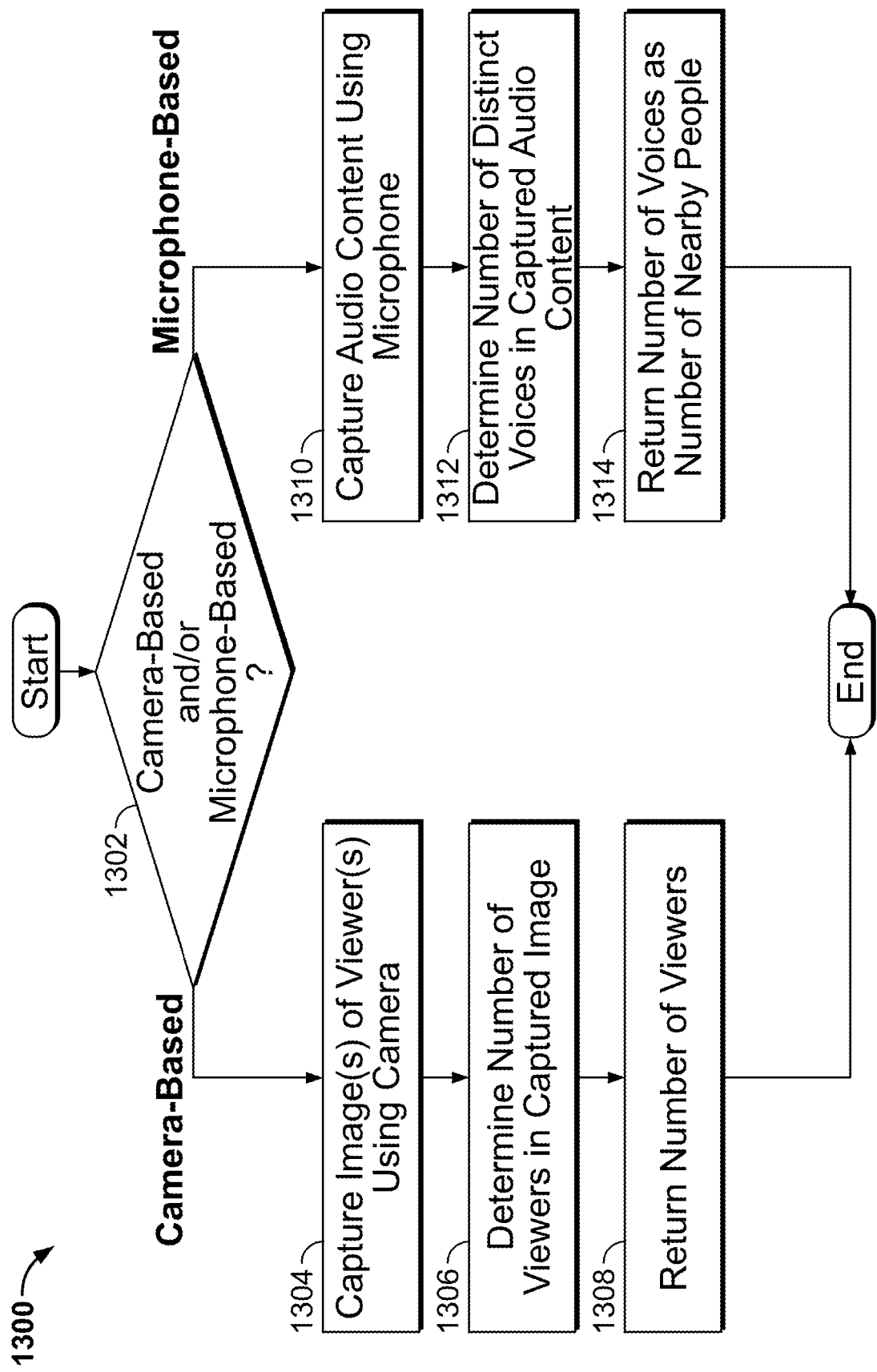
FIG. 13 is a flowchart of an illustrative process for obtaining contextual information for controlling display of content based on the presence of multiple people, in accordance with some embodiments of the disclosure.

FIG. 13 is a flowchart of an illustrative process 1300 for obtaining contextual information for controlling display of content based on the presence of multiple people, in accordance with some embodiments of the disclosure. In some aspects, control circuitry 202 may execute process 1300 to obtain contextual information at 306 as part of process 300 of FIG. 3. At 1302, control circuitry 202 determines, for example, based on the rule that may have been configured via checkbox 422 and/or 424 of user interface 400, stored at 912 (FIG. 9) and/or retrieved at 302 (FIG. 3), whether camera-based presence detection or microphone-based presence detection is enabled. Although FIG. 13 shows the camera-based and microphone-based options as alternatives, in some implementations, both camera-based and microphone-based presence detection may be used concurrently. If control circuitry 202 determines that camera-based presence detection is enabled ("Camera-based" at 1302), then at 1304 camera 218 captures one or more images of one or more viewers within a field of view near computing device 102. At 1306, control circuitry 202 determines, for example by using a known face detection algorithm, a number of viewers (or viewer faces) included in the image captured at 1304. At 1308, control circuitry 202 stores (e.g., in storage 206) and/or returns (e.g., to a routine that executed an instance of process 1300) the determined number of viewers as an item of contextual information to be used, for example at 308 of process 300 (FIG. 3). If control circuitry 202 determines that microphone-based presence detection is enabled ("Microphone-based" at 1302), then at 1310 microphone 216 captures audio content of one or more voices of people near computing device 102. At 1312, control circuitry 202 determines, for example by using a known voice detection algorithm, a number of voices included in the audio content captured at 1310. At 1314, control circuitry 202 stores (e.g., in storage 206) and/or returns (e.g., to a routine that executed an instance of process 1300) the determined number of voices (representing a number of people or bystanders, for instance) as an item of contextual information to be used, for example at 308 of process 300 (FIG. 3).

Figure 14:
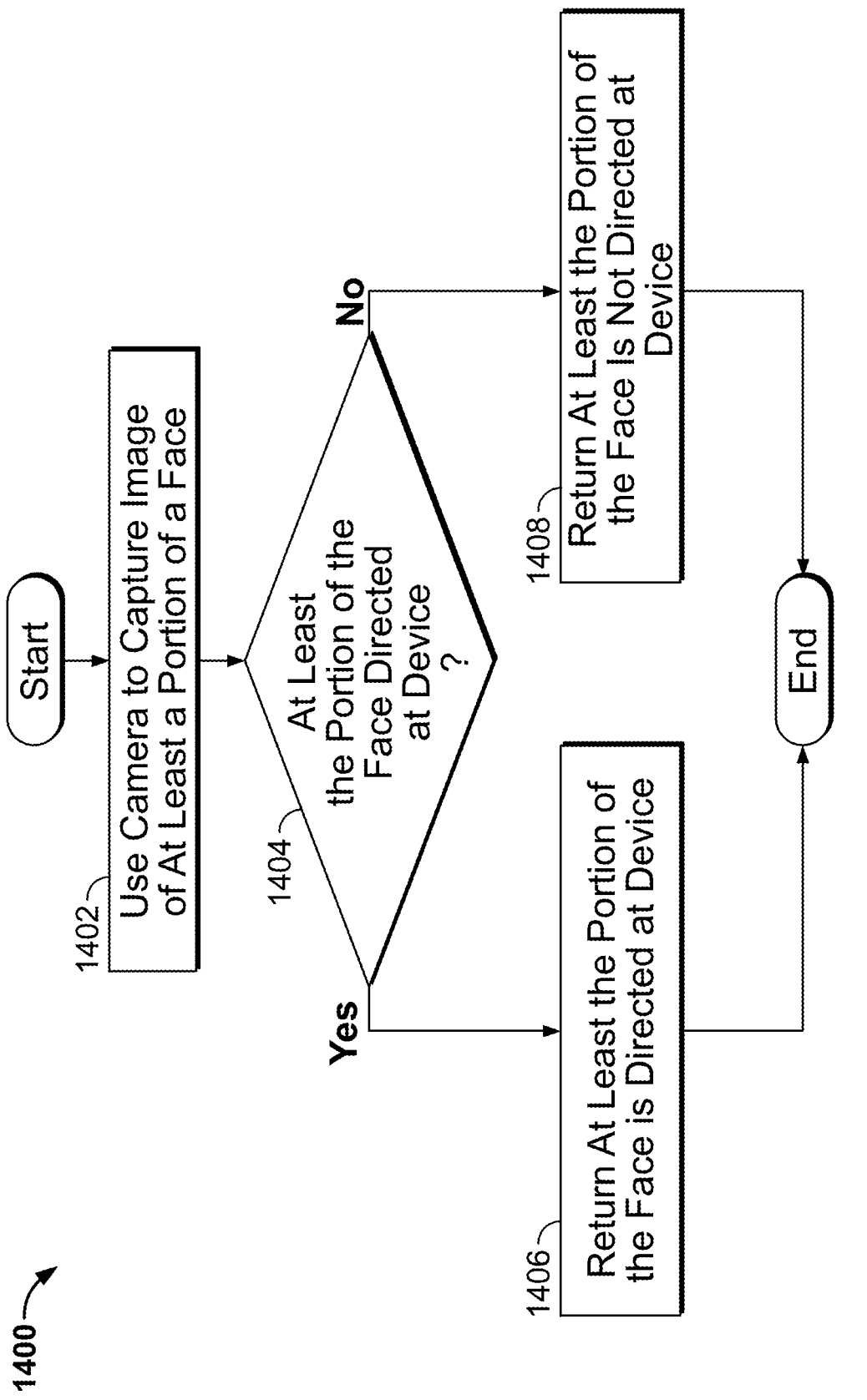
FIG. 14 is a flowchart of an illustrative process for obtaining contextual information for controlling display of content based on face detection, in accordance with some embodiments of the disclosure.

FIG. 14 is a flowchart of an illustrative process 1400 for obtaining contextual information for controlling display of content based on face detection, in accordance with some embodiments of the disclosure. Control circuitry 202 may, in some aspects, execute process 1400 to obtain contextual information at 306 as part of process 300 of FIG. 3. At 1402, camera 218, which may be a user-facing camera, captures an image of the user's face within its field of view. At 1404, control circuitry 202 determines, for instance by using a known face detection algorithm, whether at least a portion of the face is directed toward computing device 102, or more particularly toward display 212 thereof. In this manner, control circuitry 202 may determine whether the user is directing their attention toward display 212 and to any content that may be presented via display 212. If control circuitry 202 determines that at least a portion of the face is directed toward computing device 102 (or display 212) ("Yes" at 1404), then at 1406 control circuitry 202 stores (e.g., in storage 206) and/or returns (e.g., to a routine that executed an instance of process 1400) information indicating that at least a portion of the user's face is directed toward device 102 as an item of contextual information to be used, for example at 308 of process 300 (FIG. 3). If control circuitry 202 determines no portion of the face is directed toward computing device 102 (or display 212) ("No" at 1404), then at 1408 control circuitry 202 stores (e.g., in storage 206) and/or returns (e.g., to a routine that executed an instance of process 1400) information indicating that no portion of the user's face is directed toward device 102 as an item of contextual information to be used, for example at 308 of process 300 (FIG. 3).

Figure 15:
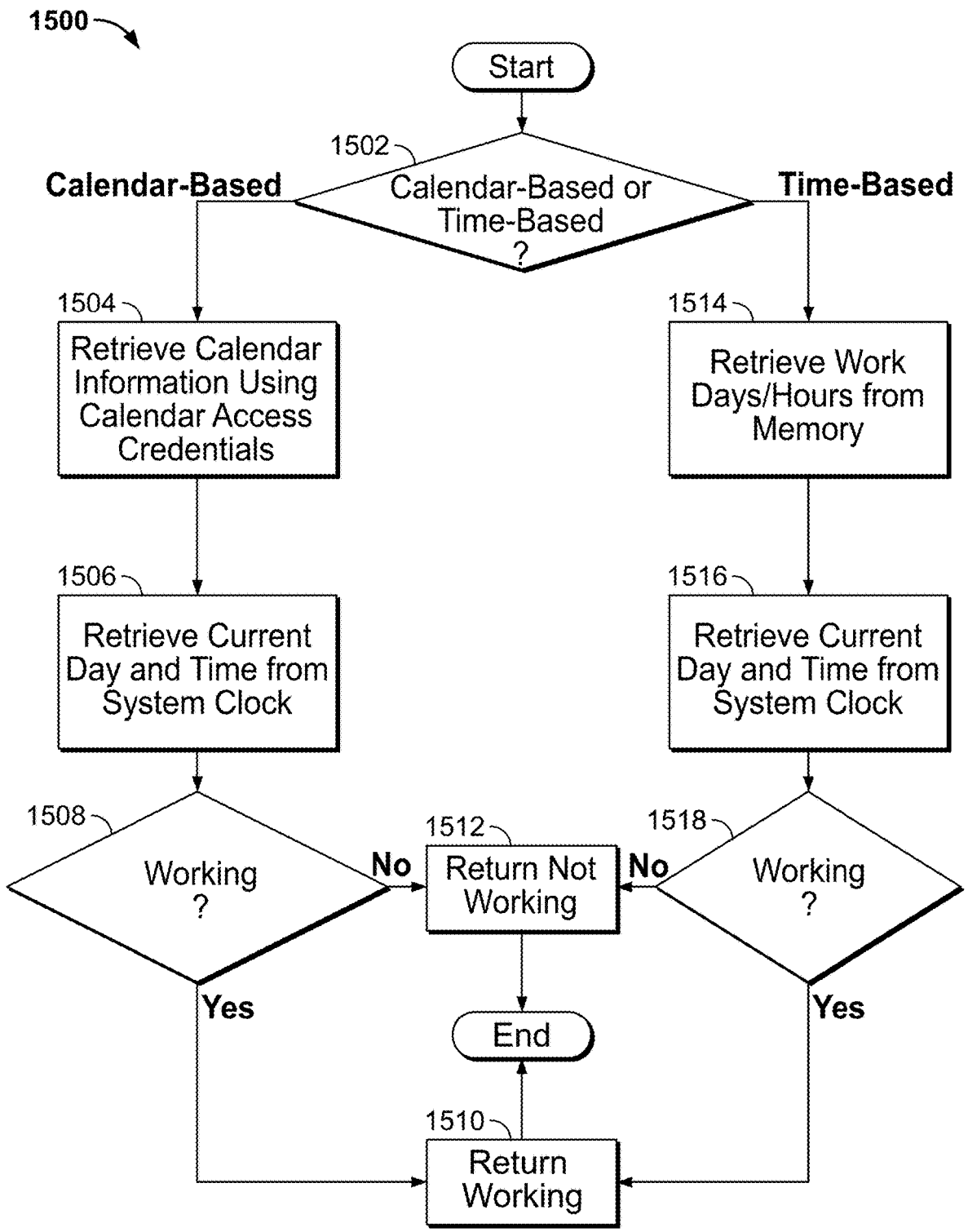
FIG. 15 is a flowchart of an illustrative process for obtaining contextual information for controlling display of content based on a personal work schedule, in accordance with some embodiments of the disclosure.

FIG. 15 is a flowchart of an illustrative process 1500 for obtaining contextual information for controlling display of content based on a personal work schedule, in accordance with some embodiments of the disclosure. Control circuitry 202 may, in some examples, execute process 1500 to obtain contextual information at 306 as part of process 300 of FIG. 3. At 1502, control circuitry 202 determines, for example, based on the rule that may have been configured via checkbox 616 and/or 716 of user interfaces 600 or 700, stored at 1118 (FIG. 11) and/or retrieved at 302 (FIG. 3), whether calendar-based content control or time-based content control is enabled. Although FIG. 15 shows the calendar-based and time-based options as alternatives, in some implementations, both calendar-based and time-based presence detection may be used concurrently. If control circuitry 202 determines that calendar-based content control is enabled ("Calendar-based" at 1502), then at 1504 control circuitry 202 retrieves calendar information using the calendar identifier and/or calendar access credentials that were received at 1110 (FIG. 11) via data input field 618 (FIG. 6) and stored at 1118 (FIG. 11). As described above, the calendar information may indicate when the user is working, for instance, based on the day and time slots during which the calendar indicates that the user has a meeting scheduled and/or the like. At 1506, control circuitry 202 retrieves the current day and time from a system clock of computing device 102 (not shown in FIG. 2). At 1508, control circuitry 202 determines, based on the calendar information retrieved at 1504 and the current day and time retrieved at 1506, whether the user is presently working. If control circuitry 202 determines that the user is presently working ("Yes" at 1508), then at 1510 control circuitry 202 stores (e.g., in storage 206) and/or returns (e.g., to a routine that executed an instance of process 1500) information indicating that the user is working, to be used as an item of contextual information, for example at 308 of process 300 (FIG. 3). If control circuitry 202 determines that the user is not presently working ("No" at 1508), then at 1512 control circuitry 202 stores (e.g., in storage 206) and/or returns (e.g., to a routine that executed an instance of process 1500) information indicating that the user is not working, to be used as an item of contextual information, for example at 308 of process 300 (FIG. 3).

Referring back to 1502, if control circuitry 202 determines that time-based content control is enabled ("Time-based" at 1502), then at 1514 control circuitry 202 retrieves information regarding the days, start times, and end times that were received at 1114 or 1126, (FIG. 11), via day fields 718, start time fields 720, and end time fields 722, respectively (FIG. 7), and stored at 1118 (FIG. 11) to define time frames (e.g., working hours) within which content should be blocked. At 1516, control circuitry 202 retrieves the current day and time from a system clock of computing device 102 (not shown in FIG. 2). At 1518, control circuitry 202 determines, based on the time information retrieved at 1514 and the current day and time retrieved at 1516, whether the user is presently working. If control circuitry 202 determines that the user is presently working ("Yes" at 1518), then at 1510 control circuitry 202 stores (e.g., in storage 206) and/or returns (e.g., to a routine that executed an instance of process 1500) information indicating that the user is working, to be used as an item of contextual information, for example at 308 of process 300 (FIG. 3). If control circuitry 202 determines that the user is not presently working ("No" at 1518), then at 1512 control circuitry 202 stores (e.g., in storage 206) and/or returns (e.g., to a routine that executed an instance of process 1500) information indicating that the user is not working, to be used as an item of contextual information, for example at 308 of process 300 (FIG. 3).

Figure 16:
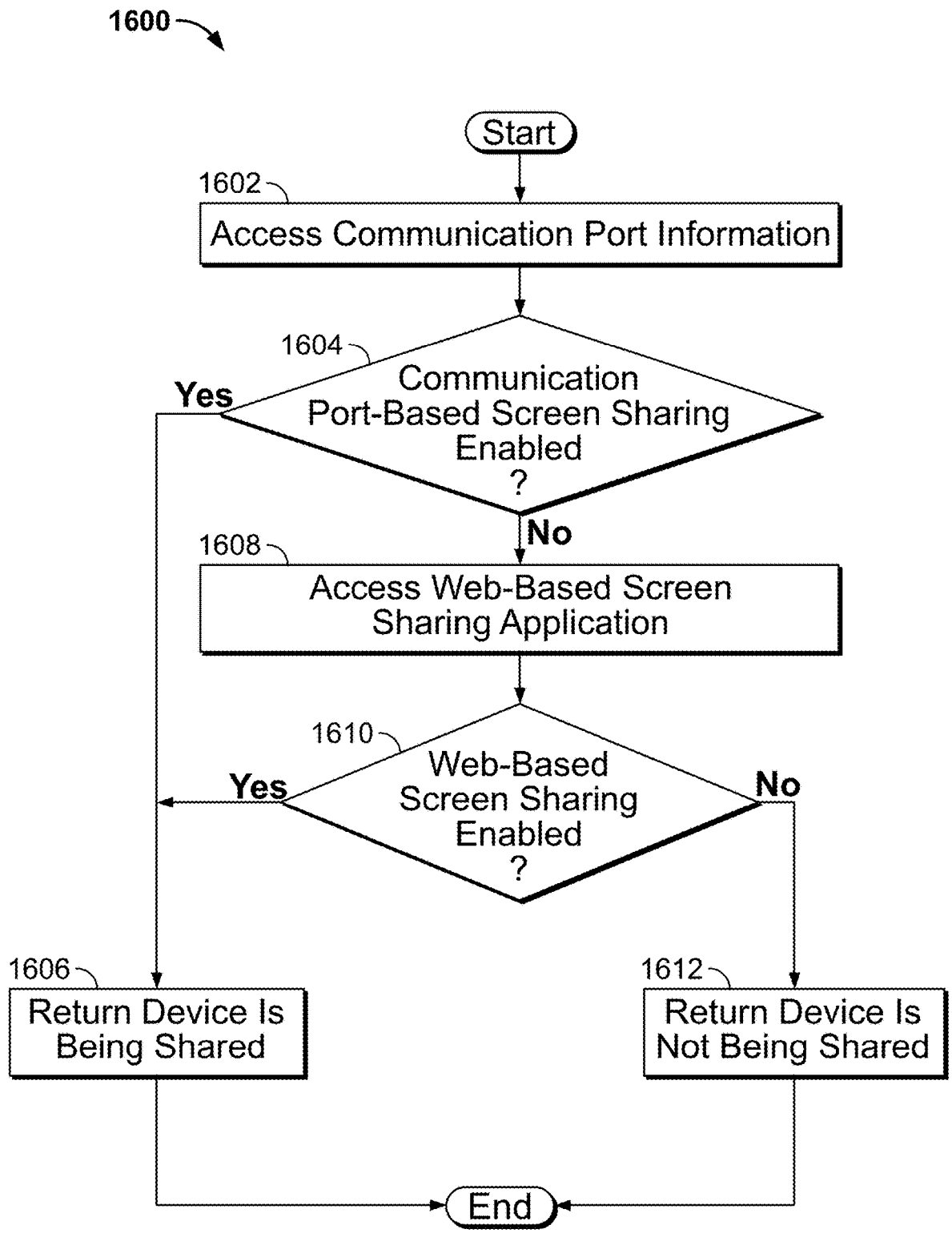
FIG. 16 is a flowchart of an illustrative process for obtaining contextual information for controlling display of content based on whether digital content is being shared among multiple computing devices, in accordance with some embodiments of the disclosure.

FIG. 16 is a flowchart of an illustrative process 1600 for obtaining contextual information for controlling display of content based on whether digital content is being shared among multiple computing devices, in accordance with some embodiments of the disclosure. Control circuitry 202 may, in some aspects, execute process 1600 to obtain contextual information at 306 as part of process 300 of FIG. 3. At 1602, control circuitry 202 accesses communication port information, for instance indicating whether I/O path 208 (or another communication port of computing device 102) is being used to share content from computing device 102 to other computing devices, such as computing devices 104. At 1604, control circuitry 202 determines, based on the communication port information accessed at 1602, whether computing device 102 is sharing content (e.g., screen sharing) with other computing devices via I/O path 208. If control circuitry 202 determines that computing device 102 is sharing content with other computing devices via I/O path 208 ("Yes" at 1604), then at 1606 control circuitry 202 stores (e.g., in storage 206) and/or returns (e.g., to a routine that executed an instance of process 1600) information indicating that computing device 102 is sharing content with other computing devices, as an item of contextual information to be used, for example at 308 of process 300 (FIG. 3). If control circuitry 202 determines that computing device 102 is not sharing content with other computing devices via I/O path 208 ("No" at 1604), then at 1608 computing device 202 accesses a web-based screen sharing application being executed via processing circuitry 204. At 1610, control circuitry 202 determines, based on the web-based screen sharing application accessed at 1608, whether computing device 102 is sharing content (e.g., screen sharing) with other computing devices via the web-based screen sharing application, for instance, via communication network 106, the Internet, or another type of communication network. If control circuitry 202 determines that computing device 102 is sharing content (e.g., screen sharing) with other computing devices via the web-based screen sharing application ("Yes" at 1610), then at 1606 control circuitry 202 stores (e.g., in storage 206) and/or returns (e.g., to a routine that executed an instance of process 1600) information indicating that computing device 102 is sharing content with other computing devices, as an item of contextual information to be used, for example at 308 of process 300 (FIG. 3). If control circuitry 202 determines that computing device 102 is not sharing content (e.g., screen sharing) with other computing devices via the web-based screen sharing application ("No" at 1610), then at 1612 control circuitry 202 stores (e.g., in storage 206) and/or returns (e.g., to a routine that executed an instance of process 1600) information indicating that computing device 102 is not sharing content with other computing devices, as an item of contextual information to be used, for example at 308 of process 300 (FIG. 3).

The processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    capturing an image of one or more faces via a camera of a computing device, the one or more faces comprising a face of a user of the computing device;
    determining, based on the captured image, whether the one or more faces are directed toward a display of the computing device;
    retrieving, from a memory, a rule delaying presentation of content via the computing device in response to detecting that the face of the user of the computing device is not directed toward the display or detecting that the captured image comprises a face of a bystander directed toward the display, and permitting presentation of content via the computing device in response to detecting that the face of the user of the computing device is directed toward the display and detecting that the captured image lacks any face of a bystander directed toward the display;
    detecting, at a first time, that the face of the user of the computing device is not directed toward the display or detecting, at the first time, that the captured image comprises a face of a bystander directed toward the display;
    based on the rule and in response to the detecting, at the first time, that the face of the user of the computing device is not directed toward the display or the detecting, at the first time, that the captured image comprises a face of a bystander directed toward the display:
        delaying the presentation of the content via the computing device;
    detecting, at a second time, that the face of the user of the computing device is directed toward the display and detecting, at the second time, that the captured image lacks any face of a bystander directed toward the display;
based on the rule and in response to the detecting, at the second time, that the face of the user of the computing device is directed toward the display and the detecting, at the second time, that the captured image lacks any face of a bystander directed toward the display:
permitting the presentation of the content via the computing device.

2. The method of claim 1, wherein the delaying the presentation of the content comprises:
storing the content in memory;
determining, based on the rule and whether the one or more faces is directed toward the display, when to permit the presentation of the content via the computing device; and
permitting the presentation of the content based on the determination of when to permit the presentation of the content.

3. The method of claim 1, wherein determining whether the one or more faces are directed toward the display of the computing device comprises determining whether at least one portion of the one or more faces is directed towards the display of the computing device.

4. The method of claim 1, wherein detecting that the face of the user of the computing device is not directed toward the display comprises detecting that no portion of the face of the user of the computing device is directed towards the display of the computing device.

5. The method of claim 1, wherein the delaying the presentation of content via the computing device further comprises detecting content to be presented via the computing device.

6. The method of claim 5, wherein detecting content to be presented via the computing device comprises interacting with web browser software being executed on the computing device.

7. The method of claim 6, wherein interacting with the web browser software being executed on the computing device comprises intercepting and parsing a webpage prior to its display via the computing device to identify any items of advertisement content, video content, or other types of content that may be embedded therein for display to the user.

8. The method of claim 1, wherein content further comprises one or more of online advertisements, video content, user-generated content, or social media content.

9. A system comprising:
a camera of a computing device configured to capture an image of one or more faces, the one or more faces comprising a face of a user of the computing device;
a display;
a memory configured to store a rule delaying presentation of content via the computing device in response to detecting that the face of the user of the computing device is not directed toward the display or detecting that the captured image comprises a face of a bystander directed toward the display, and permitting presentation of content via the computing device in response to detecting that the face of the user of the computing device is directed toward the display and detecting that the captured image lacks any face of a bystander directed toward the display;
control circuitry configured to:
determine, based on the captured image, whether the one or more faces is directed toward the display;
retrieve the rule from the memory;
detect, at a first time, that the face of the user of the computing device is not directed toward the display or detect, at the first time, that the captured image comprises a face of a bystander directed toward the display;
based on the rule and in response to detecting, at the first time, that the face of the user of the computing device is not directed toward the display or detecting, at the first time, that the captured image comprises a face of a bystander directed toward the display:
delay the presentation of content;
detect, at a second time, that the face of the user of the computing device is directed toward the display and detect, at the second time, that the captured image lacks any face of a bystander directed toward the display;
based on the rule and in response to the detecting, at the second time, that the face of the user of the computing device is directed toward the display and the detecting, at the second time, that the captured image lacks any face of a bystander directed toward the display:
permit the presentation of the content via the computing device.

10. The system of claim 9, wherein the control circuitry is configured to delay the presentation of the content by:
storing the content in the memory;
determining, based on the rule and whether at least one portion of the one or more faces is directed toward the display, when to permit the presentation of the content; and
permitting the presentation of the content based on the determination of when to permit the presentation of the content.

11. The system of claim 9, wherein the control circuitry is configured to determine whether the one or more faces are directed toward the display of the computing device by determining whether at least one portion of the one or more faces is directed towards the display of the computing device.

12. The system of claim 9, wherein the control circuitry is configured to detect that the face of the user of the computing device is not directed toward the display by detecting that no portion of the face of the user of the computing device is directed towards the display of the computing device.

13. The system of claim 9, wherein the control circuitry is further configured to delay the presentation of content via the computing device by detecting content to be presented via the computing device.

14. The system of claim 13, wherein the control circuitry is configured to detect content to be presented via the computing device by interacting with web browser software being executed on the computing device.

15. The system of claim 14, wherein the control circuitry is configured to interact with the web browser software being executed on the computing device by intercepting and parsing a webpage prior to its display via the computing device to identify any items of advertisement content, video content, or other types of content that may be embedded therein for display to the user.

16. A non-transitory computer readable medium having stored thereon computer instructions that, when executed by control circuitry, causes the control circuitry to:

capture an image of one or more faces via a camera of a computing device, the one or more faces comprising a face of a user of the computing device;

determine, based on the captured image, whether the one or more faces is directed toward a display of the computing device;

retrieve, from a memory, a rule delaying presentation of the content via the computing device in response to detecting that the face of the user of the computing device is not directed toward the display or detecting that the captured image comprises a face of a bystander directed toward the display, and permitting presentation of content via the computing device in response to detecting that the face of the user of the computing device is directed toward the display and detecting that the captured image lacks any face of a bystander directed toward the display;

detect, at a first time, that the face of the user of the computing device is not directed toward the display or detect, at the first time, that the captured image comprises a face of a bystander directed toward the display;

based on the rule and in response to the detecting, at the first time, that the face of the user of the computing device is not directed toward the display or the detecting, at the first time, that the captured image comprises a face of a bystander directed toward the display:

delay the presentation of the content via the computing device;

detect, at a second time, that the face of the user of the computing device is directed toward the display and detect, at the second time, that the captured image lacks any face of a bystander directed toward the display;

based on the rule and in response to the detecting, at the second time, that the face of the user of the computing device is directed toward the display and the detecting, at the second time, that the captured image lacks any face of a bystander directed toward the display:

permit the presentation of the content via the computing device.

* * * * *